(12) United States Patent
O'Keeffe

(10) Patent No.: US 8,508,695 B2
(45) Date of Patent: Aug. 13, 2013

(54) POLYMER-DISPERSED LIQUID CRYSTAL STRUCTURES WITH SUBSTITUENT FUNCTIONAL GROUP TO ALIGNMENT WITHIN LIQUID CRYSTAL MATERIAL BODY INTO POLYDOMAIN STATE

(75) Inventor: Donal O'Keeffe, County Clare (IE)

(73) Assignee: Vlyte Innovations, Ltd, County Clare (IE)

( * ) Notice: Subject to any disclaimer, the term of this patent is extended or adjusted under 35 U.S.C. 154(b) by 648 days.

(21) Appl. No.: 12/145,842

(22) Filed: Jun. 25, 2008

(65) Prior Publication Data

US 2008/0316395 A1    Dec. 25, 2008

(30) Foreign Application Priority Data

Jun. 25, 2007    (IE) .................................. S2007/0454

(51) Int. Cl.
*G02F 1/1333*    (2006.01)
*C09K 19/02*    (2006.01)

(52) U.S. Cl.
USPC .................. 349/86; 349/88; 349/89; 349/90; 349/91; 349/92; 349/168; 349/175; 349/176; 349/183; 349/185

(58) Field of Classification Search
USPC ............... 349/86, 183, 88–93, 168, 175–176, 349/185
See application file for complete search history.

(56) References Cited

U.S. PATENT DOCUMENTS

| | | | | |
|---|---|---|---|---|
| 4,762,764 A * | 8/1988 | Ng et al. | ......................... | 430/115 |
| 5,604,612 A * | 2/1997 | Coates et al. | ................... | 349/86 |
| 5,793,454 A * | 8/1998 | Kawazu et al. | ................. | 349/92 |
| 5,796,453 A * | 8/1998 | Nakao et al. | ..................... | 349/86 |
| 5,847,798 A * | 12/1998 | Yang et al. | ..................... | 349/169 |
| 5,871,665 A * | 2/1999 | Coates et al. | ............. | 252/299.01 |
| 5,949,508 A * | 9/1999 | Kumar et al. | .................. | 349/122 |
| 6,061,107 A * | 5/2000 | Yang et al. | ......................... | 349/86 |
| 6,067,135 A * | 5/2000 | Shimizu et al. | ................. | 349/86 |
| 6,128,056 A * | 10/2000 | Kubota et al. | ................... | 349/86 |
| 6,195,139 B1 * | 2/2001 | Yamazaki et al. | ............. | 349/43 |
| 6,203,723 B1 * | 3/2001 | Hsu | .......................... | 252/299.01 |
| 6,270,691 B2 * | 8/2001 | Park et al. | ................ | 252/299.01 |
| 6,767,480 B2 * | 7/2004 | Iftime et al. | ............. | 252/299.01 |
| 6,821,455 B2 * | 11/2004 | Kornfield et al. | ......... | 252/299.01 |
| 2004/0017523 A1 * | 1/2004 | Asada | ............................. | 349/86 |

* cited by examiner

*Primary Examiner* — Hoan C Nguyen
(74) *Attorney, Agent, or Firm* — Sughrue Mion, PLLC

(57) ABSTRACT

A polymer-dispersed liquid crystal system has a continuous polymer structure having defined therein a plurality of discrete bodies of liquid crystal material. The bodies of liquid crystal material exhibit a polydomain operating state in which the liquid crystal material within each body is arranged in multiple domains, each domain being defined by a quantity of liquid crystal material whose molecules have a substantially common identifiable alignment in at least one axis, wherein the resolved alignments of neighboring domains diverge substantially from one another and are stable over time.

19 Claims, 6 Drawing Sheets

POLYMER-DISPERSED LIQUID CRYSTAL STRUCTURES WITH SUBSTITUENT FUNCTIONAL GROUP TO ALIGNMENT WITHIN LIQUID CRYSTAL MATERIAL BODY INTO POLYDOMAIN STATE

TECHNICAL FIELD

The present invention relates to polymer-dispersed liquid crystal structures.

The invention has particular application in areas such as: light control films for use in glazing applications that are capable of switching between transparent and opaque states, generally known as "switchable windows" or "smart windows"; see-through displays that comprise a matrix of pixels each capable of being selectively operated in a transparent or opaque state, for use in applications like shop front windows, or the window of a bus or train, without blocking visual access through the window (see for example PCT Application Nos. PCT/IE 02/00079 and PCT/IE00124); projection screens, in particular where the projection screen also functions as a window by being operated in an opaque scattering state when used for projection, and opaque or transparent states when used as a switchable window; normal-mode (i.e., opaque in the absence of power and transparent in the presence of power) light shutters and displays whether made with flexible substrates (e.g. film) or rigid substrates (e.g. glass); and bistable (i.e., selectively the opaque or transparent state is stable in the absence of power—power is only used when switching from one state to the other) light shutters and displays.

BACKGROUND ART

Conventional liquid crystal (LC) devices of this type generally comprise a liquid crystal layer of controlled thickness (i.e. cell gap) sandwiched between two substrates. Each substrate is transparent and coated with a transparent, electrically conductive coating on the side facing the liquid crystal layer to enable an electrical field to be applied to the layer. The substrates may be glass or a polymer substrate film. If the substrates are film then it may be possible to laminate the liquid crystal film to regular window glass panes on one or both sides by employing an adhesive sheet known as an interlayer. Such a combined LC film and glass laminate is known as a switchable window. Saint Gobain Vitrage sells a switchable window laminate under the brand name "Priva-Lite".

The process of laminating a liquid crystal film between glass panes using one or more interlayer sheets subjects the film to pressure, elevated temperature, and vacuum. Difficulties can arise due to mismatched thermal expansion indices between the different materials. Furthermore, even after lamination, subsequent handling of the finished laminate can subject the LC layer to shear forces as the two glass panes (sandwiching the LC layer) flex, especially if the window is greater than 1 meter in any direction. In order for the film to withstand the lamination process and subsequent handling it is necessary for the LC layer to have a polymeric (or other) structure to support the liquid crystal.

There are several known polymer-LC structures. Each suffers from drawbacks. Some are fundamentally unsuitability for lamination in this type of structure, whereas those that can be laminated suffer from optical problems such as excessive haze or an excessively limited range of useful transparent viewing angles.

When considering such problems it is necessary to evaluate and balance the conflicting requirements for a given application. Thus, while it may be relatively trivial to reduce haze or increase viewing angles for a particular film by reducing the thickness of the polymer-LC film, this can have a direct impact on the ability of the film to block light when in the supposed blocking state. Ensuring an acceptable level of opacity in the blocking state may require a film of a thickness which, in the supposedly transparent state, is inherently hazy and has very limited viewing angles.

The requirement for clear, haze-free viewing over as extensive a range of viewing angles as possible, is extremely important for window applications. A person standing directly in front of a 2 m×2 m window will encounter a range of viewing angles depending on the viewer's distance from the window and on which part of the window is being looked through. If the viewer's eye is 2 meters away from the centre of the window, for example, the angle to the corner of the window is about 35 degrees; in other words, for such a window to be transparent at a distance of 2 meters, it requires a haze-free viewing angle of 35 degrees. For the same window to be transparent from a distance of 1 meter, however, increases the required haze-free viewing angle to about 55 degrees.

The main technologies of polymer-LC structure are:
1) Polymer Dispersed Liquid Crystal (PDLC) and Nematic Curvilinear Aligned Phase (NCAP);
2) Polymer Stabilised Cholesteric Texture (PSCT);
3) Polymer Dispersed Cholesteric Liquid Crystal (PDCLC); and
4) Fast switching, low voltage devices having aspects of the previous three.

Briefly, PDLC or NCAP devices have a continuous polymer structure (typically making up 40-60% of the liquid crystal layer) having discrete cavities that contain liquid crystal. The liquid crystal (nematic type) is said to form droplets within a continuous polymer matrix.

PSCT devices also rely on liquid crystal material dispersed throughout a polymer, but in PSCT devices the polymer does not encapsulate the liquid crystal in discrete droplets; instead it provides a thin, fibrous polymer network that extends into and/or through a continuous liquid crystal layer.

Generally, PDCLC devices are bistable, colour reflective devices (unlike the PDLC/NCAP and PSCT devices which are selectively transmissive). PDCLC devices have a cholesteric liquid crystal material dispersed in relatively larger droplets within a polymer matrix, with the LC material being switchable between two bistable states—one being highly reflective of a narrow band of visible wavelengths, and the other being weakly scattering. By placing the PDCLC film in front of (say) a black substrate, pixels of the display can be switched between colour reflective and black states.

Each of the three families of technology results in devices having certain advantages and certain disadvantages. Each will be described in turn in the following section before finally describing devices for fast switching and low voltage applications that have aspects common to more than one of the three.

PDLC or NCAP Devices

Polymer Dispersed Liquid Crystal (PDLC) and Nematic Curvilinear Aligned Phase (NCAP) refer to two very similar technologies distinguished from one another by the techniques used to create the respective devices. However, for the purposes of the following discussion, the end result of each technology is effectively the same.

FIG. 1 (Prior Art) shows an example of a PDLC device. A pair of polyethylene terephthalate (PET) substrates 110, each having an indium tin oxide electrode 112 on its inner face, sandwich a polymer-dispersed liquid crystal structure 114. The structure 114 consists of a 20 µm thick film composed of a polymer matrix or structure in which droplets 116 of nematic liquid crystal material have been captured by phase separation during polymerization.

The primary advantage of PDLC and NCAP type films is that the polymer structure has been demonstrated to be compatible with glass lamination. Furthermore, PDLC and NCAP films are flexible, can be cut to size from a continuous roll of film (as the liquid crystal is encapsulated by the polymer structure), and function without the need for polarizers (inherently required by twisted nematic (TN) type devices).

Referring back to FIG. 1, the liquid crystal droplets are generally spherical and have a diameter of about 0.7 µm to 1.0 µm. FIGS. 2A and 2B illustrate that in the presence of a 100V AC field (FIG. 2A) the liquid crystal 116 displays birefringence, with the refractive index of the polymer 114 matching that of the liquid crystal in the direction parallel to the major axis of the film (i.e., the ordinary refractive index, $n_o$), while in the absence of such a field (FIG. 2B), the mean refractive index of the LC material is mismatched with that of the polymer ($n_{polymer} \neq n_{effective}$ LC), resulting in scattering at each boundary between liquid crystal and polymer crossed by a light ray passing through the film.

The major problem with PDLC and NCAP devices in window glazing and see-through applications is they suffer from significant haze in the ON state as the viewing angle increases, and can become opaque for large viewing angles. The haze is caused by light scattering at the boundary or interface between the field-aligned, nematic, liquid crystal in the droplets and the encapsulating polymer. A mismatch between the refractive index of the polymer and that of the liquid crystal in the droplets due to its inherent birefringence is the reason. For example, the material sold by Merck under the catalog number "Merck TL213" has ordinary and extraordinary refractive indices of $n_o=1.527$ and $n_e=1.766$, respectively, giving a birefringence value of $\Delta n=0.239$. Generally, the ordinary refractive index of the liquid crystal is matched to the refractive index of the isotropic polymer matrix to minimize haze. But, as the viewing angle increases in the ON state the significance of the mismatch between the polymer and the liquid crystal becomes more dominant ($n_{polymer} \neq n_{effective}$ L.C.) and light scattering at the interface increases causing haze.

Another drawback of PDLC and NCAP devices is that in the OFF state (no electrical field) scattering light efficiency is determined by the difference between the mean refractive index of the liquid crystal and the refractive index of the polymer matrix. It follows from this that interface surface must be maximized by minimizing droplet size and maximizing the number of droplets. The minimum size is dictated by the wavelengths of visible light, and so PDLC and NCAP displays typically have a mean droplet diameter of 0.7 µm-1 µm (this refers to the major axis as the droplets may not be spherical).

In a typical 20 micron PDLC cell, a light ray could encounter 10 droplets or more, each having the potential to contribute to haze in the ON state, even for viewing angles close to normal. This demonstrates the inherent trade-off in PDLC devices whereby increasing the scattering power in the OFF state increases the haze in the ON state.

U.S. Pat. No. 5,604,612 discloses a PDLC device of this type, and discusses how scattering power can be maximized by optimizing the difference between the mean refractive index of the liquid crystal and the polymer matrix.

PSCT Devices

An example of a normal-mode Polymer Stabilised Cholesteric Texture (PSCT) film is shown in FIG. 3. For ease of illustration, the two operating states of interest—homeotropic (transparent) and focal conic (scattering)—are shown side by side.

The polymer in this device does not encapsulate the liquid crystal in discrete droplets, but rather it provides a thin, fibrous polymer network 120 that extends into and/or through a continuous liquid crystal layer 122 as shown in FIG. 3. It has been shown that the polymer is effective in separating the continuous liquid crystal layer into domains that individually switch quicker than a continuous layer without polymer. The liquid crystal is of the type known as cholesteric or chiral nematic. Because the LC layer is continuous, the film must be sealed using a seal such as that shown schematically at 129.

In PSCT devices a chiral dopant is added to nematic liquid crystal to impart an alignment between molecules 127, see FIG. 4, each at a slight angle to the next, which traces out a helical structure. The distance required for one full twist of the helix is known as the pitch. The pitch can be adjusted by adjusting the concentration of the chiral dopant. By selecting the pitch length accordingly, the planar texture reflects a band of visible light (this type of device is known as reflective); but when the pitch is increased further the reflected light will move into the infrared range, and light in the visible range is transmitted (this type of device is known either as normal or reverse mode).

In liquid crystal domains containing planar texture, the axes of the helices align parallel to one another and perpendicular to the substrate surface. This texture selectively reflects circularly polarized light for a band of wavelengths associated with the helical pitch of the cholesteric. Normal mode light shutters do not use the planar texture. Reverse mode light shutters use it as the transparent or clear state and avoid the homeotropic state.

The focal conic texture is similar to the planar texture in that the chiral dopant imposes a helical alignment between liquid crystal molecules, but unlike the planar texture, the axes of the helices align poorly with respect to each other—see texture on right hand side 126 of FIG. 3. Poor alignment creates an angular difference that results in the effective refractive index of the liquid crystal in one helix (or in one domain containing aligned helices) being different from its neighbouring helices (or domains) thereby causing light scattering at the boundaries. Consequently, PSCT devices have a different scattering mechanism, namely the focal conic texture, to that of PDLC devices.

In addition to the switching benefits of separating the liquid crystal into domains, a polymer network also exerts a stabilizing influence whereby the liquid crystal molecules adjacent the polymer interface take on an alignment. This alignment may be sufficient to stabilize a cholesteric liquid crystal domain in one or more of its three possible states (or textures) in the absence of power: planar (light reflecting and transmitting), focal conic (light scattering and/or transmitting), and homeotropic (clear or transparent).

In normal mode PSCT devices, the principal function of the polymer is to stabilize the focal-conic texture. The more fibrous the polymer network, the more effective it is in inducing random alignment of the helical axes (i.e. creating multiple domains) in the focal conic texture, and consequently a strong scattering state that blocks visual access through the PSCT film. It is important to note that in the absence of a polymer network, or other means such as polymer surface artefacts, to stabilize the focal conic texture, then on removing power random helical alignment will not persist, i.e. such a texture is not stable over time. In this case the focal conic texture will revert to a weak scattering/transmitting state typical of reflective PSCT devices.

The homeotropic texture is the only texture that is common to both PSCT and PDLC devices. In the presence of a strong electrical field the helices unwind in PSCT films and the liquid crystal director (i.e., the common direction of the long axes of the liquid crystal molecules) aligns parallel to the field (assumes positive dielectric anisotropy)—see texture on left hand side of FIG. 3.

U.S. Pat. No. 5,437,811 teaches normal (opaque in the absence of power) and reverse-mode (transparent in the absence of power) PSCT light-shutters that are virtually haze-free regardless of viewing angle, and have superior optical clarity to PDLC and NCAP displays even when viewing normal to the display. While the polymer percentage of the liquid crystal layer can be up to 40%, and the polymer type can be isotropic or mesogenic (i.e., a Liquid Crystal Polymer LCP), generally such devices will only exhibit good optical clarity when the polymer percentage is <10%. In addition, an electrical or magnetic field must be present during curing, and this is undesirable in a continuous film manufacturing line.

U.S. Pat. No. 6,049,366 teaches one method to manufacture PSCT light shutters for switchable window applications (referred to more generally as Polymer Stabilized Liquid Crystal PSLC in the document) on large flexible film, including the steps of providing a replicated polymer structure within the liquid crystal layer. The latter is a relatively complex process.

In U.S. Pat. No. 6,671,008 the PSCT material is filled directly between large glass panes to realise a window without the conventional steps of first producing a liquid crystal film, then laminating the film to glass panes as discussed earlier. While the disclosed method may seem attractive, there is complexity in coating standard window glass with a transparent conductor, and in getting a flatness and finish quality compatible with liquid crystal. Other manufacturing issues include filling a large area uniformly with a liquid crystal polymer mixture, achieving sufficient strength in an edge seal area to withstand the shear forces under glass flexing for X or Y dimensions >1 meter, and not least, coping with a glazing industry than is not characterized by standard sizes.

U.S. Pat. No. 7,023,600 discloses a method to make bistable, PSCT films for switchable-window applications, whereby selectively the focal conic (strong light scattering) or planar (visible light transmitting—transparent) states are stable in the absence of power. The disclosed switchable window film has the advantage that power is used only when switching from one state to the other, and no power is consumed to maintain the window in either the planar/transparent or strongly-scattering, focal conic states. While this is particularly attractive for battery-powered applications, the disclosed bistable device requires relatively high frequency (>1 KHz) switching when changing from clear to opaque, and the feasibility of applying high frequency switching to large-area (i.e., >1M$^2$) light shutters having film substrates needs to be demonstrated.

Unlike PDLC devices where the polymer structure bridges both substrates in a continuous layer, the polymer structure in PSCT cells, whether film or glass substrate, is only directed to bridging both substrates when polymer network is formed from substantially mesogenic monomer in the presence of an electrical field. In the absence of an electrical field, or for isotropic monomers, a substantial part of the polymer will form on the surface of the substrates, particularly the substrate facing the ultra-violet light curing source, resulting in a polymer layer that contributes very little to film structure. If the polymer content (and/or monomer functionality) is increased to force more bridging, then the optical clarity suffers greatly as found in U.S. Pat. No. 6,049,366 for PSCT examples having >20% polymer.

In normal-mode PSCT films containing mixtures of mesogenic and/or isotropic monomers, the polymer networks are prone to damage resulting in unacceptable localized optical degradation. Other problems include network damage from bending of the film, especially when bending from a corner, regions of broken network and non-uniform cell thickness resulting from laminating the film to glass, and broken network resulting from picking up a large glass laminate by a corner, or flexing the glass.

In summary, PSCT devices, whether produced on film or glass substrates, are characterized by relatively little increase in haze with viewing angle when compared to PDLC devices. This accrues from having the liquid crystal in a continuous layer. Optical clarity is best when the polymer content, present in the liquid crystal region as polymer network, is <10%. PSCT devices have an alternative scattering mechanism to PDLC devices, focal conic texture, but require a polymer network to stabilize the focal conic texture with sufficient scattering power to block visual access. However, despite having superior optical characteristics to PDLC devices, PSCT films made according to prior art methods have insufficient mechanical strength to be suitable for the demands of the applications contemplated herein.

PDCLC Devices

Polymer Dispersed Cholesteric Liquid Crystal PDCLC devices from the prior art are designed for reflective display applications and do not work as switchable windows. An example of a reflective, bistable PDCLC film is shown in FIG. 5, which again shows the two states alongside one another, in this case the reflective planar texture on the left, as indicated at 130, and the weakly scattering focal conic texture on the right, as indicated at 132. The film again has a pair of substrates 110 carrying electrodes 112, which sandwich a polymer structure 114. In this case the liquid crystal is provided as larger volumes 116, as explained further below.

When incident light 133 falls on the planar texture, a band of circularly polarized light is reflected 134 while the remaining light is transmitted by the liquid crystal layer but absorbed by black paint 136 on the rear substrate. The focal conic texture transmits light, weakly scattered, to the light absorbing (i.e. black paint) coating on the rear substrate. The homeotropic state is not used in this type of display as it is not stable in the absence of power, unlike the other two states that are. Exemplary reflective displays are discussed in the January 2007, Journal of the Society For Information Display (SID), "*Progress in flexible and drapable reflective cholesteric displays*", and shown on Kent Displays, Inc. website: www.kentdisplays.com Unlike PSCT devices, PDCLC devices do not rely on a polymer network to stabilize the liquid crystal textures, rather the anchoring of the liquid crystal molecules to the polymer surface is sufficiently strong and uniform to induce the planar state. The focal conic state only weakly scatters light because the same polymer surface anchoring which allows for a stable planar texture also imposes a strong ordering within the focal conic texture. This can be seen by comparing the weakly scattering focal conic texture of FIG. 5 with the strongly scattering texture of FIG. 3. For reflective PDCLC applications, weak scattering is highly desirable, but it makes such devices unsuitable for switchable windows and similar applications.

PDLC type displays are compared to reflective PDCLC displays in the article titled "Flexible Encapsulated Cholesteric LCDs by Polymerization Induced Phase Separation", by Tod Schneider et al. in the Society for Information Display SID 05 Digest, pages 1568-1571. The article is based on disclosures in US Patent Publication No. 2007/0026163. "In a typical PDLC, the droplets are generally spherical, less than 1 micron in diameter, and are numerous in number throughout the thickness of the cell. In [the article's PDCLC displays] the droplets are more pancake in shape, on the order of magnitude of ~10 micron (or more) in diameter, and are singular throughout the thickness of the cell. [The article's PDCLC displays] operate in the reflective and scattering (to a light-absorbing back plane) modes, i.e., [they] have very little light scattering in both modes".

In "Anchoring Behaviour of Chiral Liquid Crystal at Polymer Surface: In Polymer Dispersed Chiral Liquid Crystal Films", by Haixia Wu, Georgia Institute of Technology, 2004 the chemical structure of acrylate and methacrylate monomers (i.e., prepolymers) most likely to promote strong uniform anchoring to stabilize the planar state for bistable, reflective PDCLC displays are discussed. In the PDCLC trials conducted the droplet shape was described as polygonal having X-Y axis in the range 30-50 micron, and a cell gap of 10 micron. However, the area found to be fully functional within these polygonal droplets was only around 4 $\mu m^2$, and the polymer content of the liquid crystal layer was only 10%.

In U.S. Pat. No. 6,061,107 polymer/cholesteric liquid crystal dispersions are provided in which, similar to PDLC devices, the liquid crystal phase separates into discrete droplets within a continuous polymer matrix. But, unlike PDLC displays where the droplets have a major axis of about 1 micron, the disclosed droplets in the reflective PDCLC displays have a major axis that is greater than the cell gap (i.e., the thickness of the layer containing the polymerized liquid crystal). In FIG. 5, the cell gap is shown as 4 μm. The patent teaches that by having the droplet size much larger than the pitch of the cholesteric liquid crystals, inside the droplets the liquid crystal molecules behave similar to surface modified reflective cholesteric devices.

In U.S. Pat. No. 6,556,262 a reflective PDCLC with memory (i.e., bistable) is disclosed having a preferred droplet range of 8-10 micron. The focal conic state is so weakly scattering as to be described as being transparent. In the later US Application 20060066803 by the same applicant, it is stated that the contrast of a PDCLC display is degraded if there is more than a single layer of droplets sandwiched between the electrodes at most points of the display. It is further stated that preferably the droplets have a ratio thickness:length from 1:2 to 1:6.

Reflective, bistable PDCLC devices can be prepared by adopting the methods used in PDLC and NCAP devices. In the documents already cited, U.S. Pat. No. 6,061,107 uses the method known as Thermally Induced Phase Separation TIPS to prepare the PDCLC disclosed; U.S. Pat. No. 6,556,262 uses the emulsification method (also used by NCAP devices); and in the article by Tod Schneider et al. in SID 05 Digest, pages 1568-1571, a photoradical Polymerization Induced Phase Separation PIPS method is described.

Fast-Switching, Low-Voltage Devices

It is known that liquid crystal devices containing polymer walls or polymer networks (e.g., PSCT devices) have faster switching times (i.e. turn ON and OFF) and lower operating voltage than devices without such walls or networks. But PDLC displays are an exception in that the small droplet size typical of such films is known to increase switching times and operating voltage.

U.S. Pat. No. 6,203,723 discloses a PDLC type film having microencapsulated droplets that contain not just nematic liquid crystal, but also polymer network (similar to PSCT devices). The polymer network disrupts the alignment of the nematic liquid crystal within droplets causing domains to form therein, each domain has a different liquid crystal molecular alignment, and the polymer network stabilizes the alignment. While such devices have improved switching characteristics, and light scattering, the polymer network within droplets will cause increased haze as the interface surface area between polymer and liquid crystal is significantly increased. Light refracts not just at a droplet's polymer surface, but also as it enters and leaves the dense polymer network within a droplet. Such devices are unsuitable for the applications contemplated herein because of their high level of haze in the ON state.

U.S. Pat. No. 5,455,083 discloses a cholesteric liquid crystal optical shutter for projection type applications having superior operating voltage without loss of switching speed. The polymer is said to be formed into a structure of thin cell walls, and the introduction of these cell walls is said to create more focal conic domains per volume when compared with a continuous cholesteric liquid crystal layer that does not contain any polymer. The scattering properties of the disclosed device are not compared with a conventional PDLC film, and it is likely that scattering occurs principally at the interface between a polymer wall and the liquid crystal—similar to PDLC devices. There is nothing in the document to show that the scattering within droplets, at the boundaries of polydomains, is anything other than weak, and the latter scattering mechanism is not discussed in the document. In the patent's examples the OFF state is only required to scatter a 2 mm parallel light beam by plus or minus 0.57 degrees (2 mm aperture at 100 mm from the device) for it not to be received by the sensor. Clearly, the light scattering available from such devices is not sufficient to block visual access in films used for glazing applications.

Furthermore, the patent's examples 1 and 2 show that a film with 9% polymer content has good light transmission normal to the device's surface—90%—but that this falls to 75% when the polymer content is 15%—example 3. The reduced light transmission in the latter example is caused by light scattering (i.e., haze) in the ON state. This shows that such devices have significant haze and are unsuitable to meet the haze-free viewing requirements of the applications contemplated herein.

Furthermore, if the polymer content is to be held at 9% to avoid significant haze in the ON state, then a film with such a polymer content is unlikely to possess sufficient strength to be compatible with glass lamination processes, or use in large (<1M$^2$) glass laminates.

Lastly, though the document claims to form droplets of liquid crystal within the polymer composite film, at a polymer content of 9% there is insufficient polymer to form discrete droplets in the range indicated, rather it is more likely that an interpenetrating network of liquid crystal volumes having thin polymer walls is formed. The type of polymer system used further supports this contention: oligomers of urethane acrylate and a high percentage (20% by weight of prepolymer) of trifunctional acrylate trimethylol propanetriacrylate monomer. In the previously cited U.S. Pat. No. 6,203,723 such a polymer system at a polymer content of 6% was used to create a "web-like structure (polymer network) within liquid crystal".

In summary, devices of the type disclosed in U.S. Pat. No. 5,455,083 are unsuitable for the glazing applications contemplated herein because they have insufficient scattering power in the OFF state, suffer from too much haze in the ON state, have insufficient structural strength at the polymer content disclosed, and lastly, the liquid crystal/polymer composite film is not self sealing as discrete droplets of liquid crystal are not formed.

One of the inventors of U.S. Pat. No. 5,455,083 is also the inventor of a number of related devices having improved switching characteristics in common, for example: US 2004/0017523, U.S. Pat. No. 6,924,873, WO 01/55782 and WO 02/093241. Similar to U.S. Pat. No. 5,455,083, the polymer content is 10% or less and the polymer system is also similar. The liquid crystal device in US 2004/0017523 for example is said to have the liquid crystal/polymer composite film of the type in JP4119320. The polymer network in the latter is described as "a three dimensional mesh shape" and is shown in the document's drawings as allowing interpenetrating regions or volumes of liquid crystal. In addition, nematic liquid crystal molecules are shown aligning parallel to each other and perpendicular to the local polymer wall surface. For the reasons cited previously for U.S. Pat. No. 5,455,083, these devices are not suited for the applications contemplated herein.

U.S. Pat. No. 5,559,615 envisages a PDLC device for use in an active matrix type display where substituting the prior art nematic liquid crystal with a cholesteric type liquid crystal will improve such a device's turn-off time and light scattering. On turning off the electrical field the "(chiral) twisting force strongly acts between the liquid crystal molecules. For this reason the aligned state (ON) of the liquid crystal molecules is quickly returned to a twisted/aligned state." The light scattering power will be increased "Since liquid crystal molecules are set in a twisted/aligned state in the absence of an electric field, the randomness (degree) of alignment of liquid crystal molecules is high, and the difference between the refractive indexes of the polymer resin and liquid crystal constituting the polymer dispersed liquid crystal film is large." Crucially, the document sees the scattering mechanism as being refraction of light at the liquid crystal/polymer interface. Nowhere in the document is it envisaged that light scattering will occur at the boundaries between liquid crystal domains within droplets.

The document envisages using the same polymer system as in prior art PDLC devices, specifically that shown in the document's prior art FIGS. 13A and 13B. In FIG. 13A nematic liquid crystal molecules adjacent the polymer surface are shown aligned parallel to the local surface. Other than stating that the polymer system of prior art PDLC devices will be used, and discussing in general a photo-radical polymerization induced phase separation type process, the document does not show how to form the polymer structure, or what the characteristics of that structure might be. For example, the following are unknown: the prepolymer components, the percentage weight of each component, the percentage weight of polymer in the liquid crystal mixture, suitable types of nematic liquid crystal and chiral dopants, or UV curing conditions. It is clear from the preceding that the applicants envisaged a device having the same polymer structure in all respects as prior art PDLC devices. It follows from this that the liquid crystal droplets were also envisaged to be the same as in PDLC devices—0.7 micron to 1.0 micron mean diameter. Furthermore, the document's FIG. 4A shows that in the document the mean diameter "d" of a droplet is the same as "the mean diameter of the liquid crystal domains", and, the only requirement is that "d" is larger than the helical pitch. Again, this requirement is satisfied by the prior art PDLC droplet size: 0.7 to 1 micron.

But, the present applicant has found that prior art PDLC droplet sizes of 0.7 micron to 1.0 micron are too small to achieve significant light scattering within droplets, regardless of whether nematic or cholesteric liquid crystal is used. The main scattering mechanism in such devices remains a droplet's polymer/liquid crystal interface, and so devices of the type envisaged by U.S. Pat. No. 5,559,615 have a different principle scattering mechanism, and significantly weaker scattering power, than the devices of the present invention.

It is apparent from the preceding analysis that there is a need for a liquid crystal film that has the structural advantages of PDLC films in terms of compatibility with lamination to glass, but which overcomes the significant increase in haze with viewing angle inherent in PDLC films. PSCT films, while having superior optical properties in some respects, lack the internal structure of PDLC films and have been found to be not compatible with lamination to glass and other laminates using conventional means. PDCLC films in the prior art are not suited for use in glazing application as their optical properties limit their use to reflective and conventional displays.

DISCLOSURE OF THE INVENTION

The invention provides a polymer-dispersed liquid crystal system, comprising a continuous polymer structure having defined therein a plurality of discrete bodies of liquid crystal material, said bodies of liquid crystal material exhibiting a polydomain operating state in which the liquid crystal material within each body is arranged in multiple domains, each domain being defined by a quantity of liquid crystal material whose molecules have a substantially common identifiable alignment in at least one axis, wherein the resolved alignments of neighbouring domains diverge substantially from one another and are stable over time.

In the polymer-dispersed liquid crystal systems of the invention, scattering primarily occurs at the inter-domain boundaries within the individual bodies of liquid crystal (LC) material when that material is in its polydomain state. This can be distinguished from PCLD/NCAP devices where scattering occurs primarily at the LC/polymer boundaries of the droplets due to a refractive index mismatch (when in the OFF state). Similarly, in prior art PDCLC devices, scattering occurs primarily at the LC/polymer boundaries of the droplets, and scattering within droplets is weak because of strong ordering of the LC helices both at the polymer interface and consequently within a droplet's liquid crystal bulk. Such devices lack highly divergent domains within the bodies of LC material. While PSCT devices have LC domains, the LC material is not in discrete bodies and the polymer is not a continuous structure. Indeed the very features that promote the domain formation are the filaments of polymer extending through the LC material and such filaments do not provide the structural strength of a continuous polymer structure.

Preferably, said bodies of liquid crystal material, in the polymer-dispersed liquid crystal systems of the invention, can also be influenced to exhibit a uniform operating state in which the majority of the liquid crystal molecules within each discrete body of liquid crystal material assume a substantially common identifiable alignment in at least one axis.

Preferably, transitions between the polydomain and uniform states can be caused by the application to said structure of a suitable electromagnetic signal or field.

Preferably, said bodies of liquid crystal material can also be influenced to exhibit a range of intermediate states between said polydomain and uniform operating states, resulting in said polymer-dispersed liquid crystal system having optical properties intermediate between those exhibited in the polydomain and uniform operating states.

Thus, in an application like a switchable window, careful application of appropriate electrical or magnetic fields can induce a range of greyed out states intermediate between transparent and opaque (or fully scattering) states.

Preferably, said liquid crystal assumes a focal conic texture in said polydomain operating state.

Preferably, said polydomain operating state scatters light within a liquid crystal body by refracting light at each boundary between divergent domains.

Preferably, the system further comprises dye molecules in the liquid crystal bodies, wherein said polydomain operating state scatters and absorbs light within a liquid crystal body by refracting light at each boundary between divergent domains and absorbing light as it passes through dye molecules within domains.

Preferably, said liquid crystal is a cholesteric liquid crystal operated in normal-mode.

Preferably, said polymer structure is a film and said bodies of liquid crystal are formed therein as discrete, dispersed droplets.

Preferably, a majority of said discrete bodies of liquid crystal material have a volume falling within a range bounded by an upper and a lower limit, said lower limit being the minimum volume capable of possessing multiple domains having substantially divergent alignment in the polydomain operating state, and said upper limit being the maximum volume at which a substantially divergent alignment of domains can still be retained and stabilized within said body in the polydomain operating state.

The range of the present invention's droplet volume differs from prior art PDCLC displays because in order to achieve substantially divergent alignment at the lower volume limit the droplet volume must be greater than prior art devices having the same droplet size as PDLC displays (i.e., 0.7 μm to 1.0 μm). Of the other prior art PDCLC devices, their droplet volume is too large to stabilize and sustain a droplet's liquid crystal bulk in a substantially divergent alignment of domains due to the short pitch of their helices, and the parallel surface alignment of the liquid crystal/polymer interface; consequently, after turning off an electrical field they resolve to a weakly divergent focal conic texture over time.

Preferably, greater than 75%, and more preferably, greater than 85%, of the discrete bodies of liquid crystal material have a volume lying in the range between said minimum and maximum volumes.

Preferably, the largest dimension of at least 75% of the liquid crystal bodies within the polymer structure is in the range of 2.5 to 35 microns; more preferably in the range 3.0 to 25 microns; and most preferably in the range of 3.0 to 17.5 microns.

Preferably, the total polymer/liquid crystal interface surface area corresponding to a centimeter square of viewing surface, and expressed in units of centimeters square, where X is a film's cell gap and Y is a film's fraction of liquid crystal by weight, is in the range of 1,714XY to 24,000XY; more preferably in the range of 2,400XY to 20,000XY; and most preferably in the range of 3,429XY to 20,000XY.

Preferably, said liquid crystal material is a cholesteric liquid crystal material having a cholesteric pitch, and the maximum liquid crystal body volume is defined by a maximum dimension of up to thirty times the cholesteric pitch of the liquid crystal material.

Preferably, in order to maximize a droplets upper volume limit, the pitch of the cholesteric liquid crystal is >0.8 micron, more preferably >0.9 micron, and most preferably >1 micron.

Preferably, in order to minimize the operating voltage necessary to obtain the uniform state (i.e., a clear/transparent state or ON) the pitch of the cholesteric liquid crystal is >1.0 micron, more preferably >1.2 micron, and most preferably >1.3 micron.

Preferably, in order to minimize the phenomenon known as 'red-image bleed-through' (i.e. where red light is scattered less than shorter visible wavelengths), the pitch of the cholesteric liquid crystal is >1.0 micron, more preferably >1.2 micron, and most preferably >1.3 micron.

Preferably chiral dopant(s) is added to nematic liquid crystal to make it cholesteric, and preferably one or more chiral dopant components has a Helical Twisting Power (HTP) magnitude that is >20, and more preferably >30.

Preferably, said bodies are ellipsoid and have a ratio of major axis length to minor axis length of less than 3:1.

Said bodies can also be generally spherical ellipsoid bodies and have a major axis length to minor axis length ratio of less than 1.5 to 1.

In certain embodiments, the system is provided as a generally planar structure and said bodies have a generally polygonal cross section when viewed from a direction normal to the plane of said structure.

Preferably, at the interface between a liquid crystal body and the polymer structure, the polymer surface's molecular structure influences the liquid crystal molecules to assume an alignment that diverges from the plane of the polymer surface.

This feature of the polymer surface influencing the molecules to have a divergent alignment relative to the plane of the polymer surface is very different from conventional systems in which the goal is to align the LC molecules either parallel to or perpendicular to the polymer surface to achieve the sought-after textures.

Preferably, the majority of neighbouring liquid crystal molecules at the polymer surface do not have substantially the same alignment and they substantially diverge from one another.

Further, preferably, as a consequence of the alignment of liquid crystal molecules at the polymer surface, the domains that contain liquid crystal molecules that are adjacent the polymer surface have alignments that also diverge from one another, in substantially different directions.

Most preferably, said molecular structure at said polymer surface comprises substituent functional groups extending from the polymer backbone into the liquid crystal material, and said substituent functional groups cause said mutually divergent alignment within the liquid crystal material adjacent the polymer surface.

Preferably, said liquid crystal material exhibits a focal conic texture when in said polydomain state, and said substantially divergent domains in said focal conic texture are caused by substantially divergent alignment of liquid crystal molecules at the polymer surface.

Preferably, said substituent functional groups support liquid crystal molecule interdigitation, and due to steric effects, said substituent functional groups are spaced apart or tilted sufficiently to allow interdigitized liquid crystal molecules to tilt or assume an angle to the local normal to the polymer surface.

Preferably, the majority of said liquid crystal molecules adjacent the polymer surface lie at angles to the local normal to the polymer surface of from 10 to 80 degrees.

More preferably, the majority of said liquid crystal molecules adjacent the polymer surface lie at angles to the local normal to the polymer surface of from 20 to 70 degrees.

Most preferably, the majority of said liquid crystal molecules adjacent the polymer surface lie at angles to the local normal to the polymer surface of from 25 to 65 degrees.

Preferably, said substituent functional groups extending from the polymer backbone into the liquid crystal material are substantially formed from one or more monofunctional monomers.

The substituent functional groups preferably comprise a linear chain having greater than or equal to four carbon atoms.

Furthermore, said substituent functional groups can further comprise one or more branches of one or more carbon atoms extending from said linear chain between the second and antepenultimate linear carbon atoms.

Preferably, said branches each have greater than or equal to two carbon atoms in a chain.

Preferably, said substituent functional groups are formed substantially from monofunctional monomer 2-ethyl hexyl methacrylate.

Preferably, the polymer is formed from a polymer precursor comprising an acrylate crosslinker and acrylate monofunctional monomers, or a methacrylate crosslinker and methacrylate monofunctional monomers.

Preferably the crosslinker trimethylolpropane trimethacrylate comprises thirty percent or more of the total crosslinker monomer(s) weight, and most preferably is the sole crosslinker.

In currently preferred embodiments, the polymer is formed from a polymer precursor comprising primary and secondary monomers, the secondary monomer being a monofunctional monomer, being in the minority by percentage weight, and being substantially consumed before said primary monomer has formed the polymer surface interface with said liquid crystal bodies.

Preferably, said secondary monofunctional monomer is isobornyl methacrylate or ethyl methacrylate.

Preferably, the ratio of polymer precursor to liquid crystal material in the prepolymerization solution is from 10:90 by percentage weight to 70:30 by percentage weight, and more preferably from 20:80 by percentage weight to 50:50 by percentage weight.

The invention also provides a method of preparing a polymer-dispersed liquid crystal system by polymerization induced phase separation, comprising the steps of:
 a) preparing a pre-polymerization mixture of a monofunctional monomer, a cross-linking monomer, a liquid crystal material, and a cell spacer material;
 b) initiating polymerization of said monofunctional monomers and said cross-linking monomers and thereby inducing phase separation of said liquid crystal into droplets within the resultant polymer structure;
 characterized in that the ratio of crosslinking monomer to monofunctional monomer is sufficiently low to ensure that the crosslinker is substantially consumed in the polymerization reaction prior to the formation of the interface surface between a liquid crystal body and the polymer structure, but is sufficiently high to ensure separation of the liquid crystal into discrete bodies and the formation of said discrete bodies within a continuous polymer structure.

Preferably, said step of initiating polymerization comprises exposing said mixture to electromagnetic energy to photo-radically cure said prepolymers.

The polymer structure can be formed in the absence of an electrical or magnetic field, and does not require the liquid crystal molecules to be uniformly aligned during curing.

The invention also provides a liquid crystal device comprising a polymer-dispersed liquid crystal structure as aforesaid in the form of a film, a pair of substrates sandwiching said film and bonded to said film, each substrate having a conductive electrode coating on the side facing said polymer-dispersed liquid crystal film to facilitate applying an electric field across said film.

Said substrates can also be a polymer film and have a transparent conductive electrode coating on one side.

The invention maximises the stabilized divergence of domains in the polydomain state of a liquid crystal device by selecting the rate of discharge of said device while transitioning from the homeotropic state to the polydomain state.

The device is preferably provided as a continuous roll, allowing an individual device to be cut to size from a roll of said device while maintaining the integrity of the individual device.

For a number of important applications, the device is preferably provided in a thickness that is operable in a uniform state that is transparent and substantially haze-free to the human eye for a range of viewing angles up to 30 degrees from the normal, and in a polydomain state that blocks visual access through said film.

Preferably, the conductive electrode coating on at least one substrate is patterned to provide independently and selectively addressable electrode areas.

Most preferably, the polymer structure of said device has sufficient internal structural strength and adhesion to said polymer substrates as to be able to withstand lamination to glass panes in processes compatible with ethylene-vinyl acetate (EVA) interlayer use.

The invention also provides a glazed structure comprising a pair of transparent load-bearing sheets sandwiching a liquid crystal device as set out above.

One or both of said transparent load-bearing sheets can be a glass pane; alternatively, one or both is an acrylic sheet.

As used herein the term monomer refers to material containing molecules that are generally in single molecule form as opposed to compounds of such monomers such as dimers, trimers, tetramers, quadramers, pentamers, octamers, decamers, etc. or, oligomers—polymers with relatively low number of units.

DETAILED DESCRIPTION OF THE INVENTION

Figure 6:
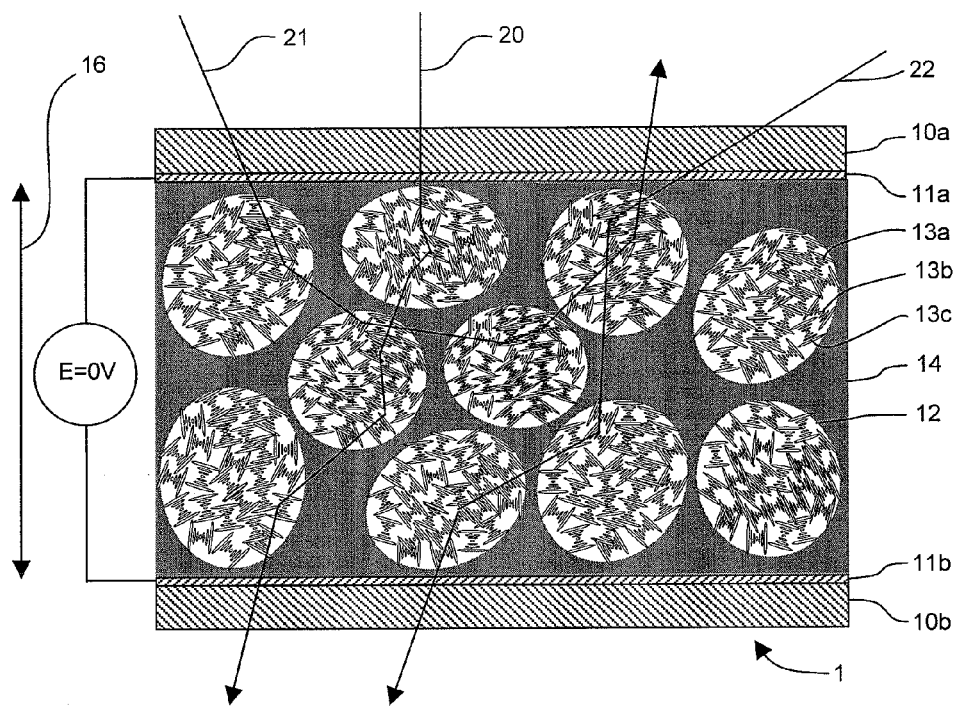
FIG. 6 is a cross section of a PDCLC film of the present invention in the field OFF state.

FIG. 6 shows a polymer-dispersed liquid crystal structure according to the invention in the form of a film 1 in the strongly light scattering state characteristic of the zero electrical field/OFF state. Incident light ray 20 enters the film 1 normal to its surface but is refracted at the boundaries between liquid crystal domains in droplets 12. Light ray 20 is shown exiting film 1 at a significant angle to the normal. Light ray 21 enters at about 30 degrees to the surface normal but is effectively internally reflected and exits through the same surface as it entered. Finally, light ray 22 is incident at an acute angle and it too is scattered to exit at some significantly different angle.

Figure 7:
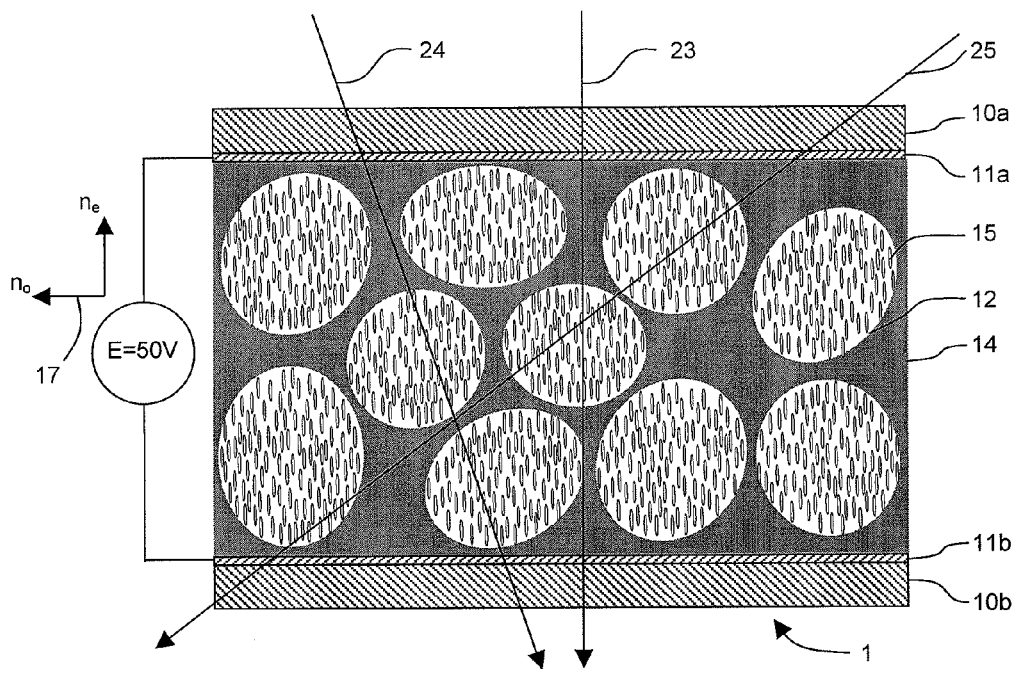
FIG. 7 is a cross section of a PDCLC film of the present invention in the field ON state.

FIG. 7 shows a polymer-dispersed liquid crystal structure according to the invention in the form of a film 1 in the clear/transparent state for visible light wavelengths characteristic of a suitably strong electrical field/ON state. When viewed about the normal to the face of the substrates, as indicated by light ray 23, the display is substantially free of haze, and has clarity close to that of glass. As viewing angle with respect to the normal increases, as indicated by light rays 24 and 25, haze increases slightly with its level dependant on droplet 12's volume for a given cell gap and the liquid crystal birefringence. For light incident normal to the face of the film, the liquid crystal's refractive index is $n_e$ and is referred to as the extraordinary refractive index. The direction of the liquid crystal refractive indices in the homeotropic state is indicated by numeral 17.

Turning first to the OFF state: in FIG. 6, a droplet 12 contains cholesteric liquid crystal whose molecules are aligned into helical structures, referred to by numerals 13a, 13b and 13c. A region comprising helices whose axes are parallel, and so having the same refractive index, is called a domain, and a droplet 12 will contain many such domains—generally referred to as a polydomain texture or a focal conic texture—in the OFF state. At the boundary of each domain there is a refractive index mismatch with neighbouring domains, the greater this refractive index mismatch, which arises from the divergence of the helical axes and the birefringence of the liquid crystal, the more strongly light will be refracted. In FIG. 6 the axes of the helical structures 13a, 13b and 13c are not parallel, so each belongs to a different domain within a droplet 12. The present invention maximizes the opaqueness of the OFF state by maximising the number of domains, and the divergence of domains, that are stabilized within a droplet 12.

Since the film 1 employs cholesteric liquid crystal in the droplets 12, which are themselves polymer-dispersed, the device and film will be referred to for brevity as a PDCLC (polymer-dispersed cholesteric liquid crystal) device or film. It is to be understood that the use of this shorthand does not imply that the present invention's devices are the same as the prior art PDCLC devices, from which they can be readily distinguished by their strength of scattering and dominant scattering mechanism in the OFF state, and see-through capability and haze-free appearance in the ON state.

Figure 5:
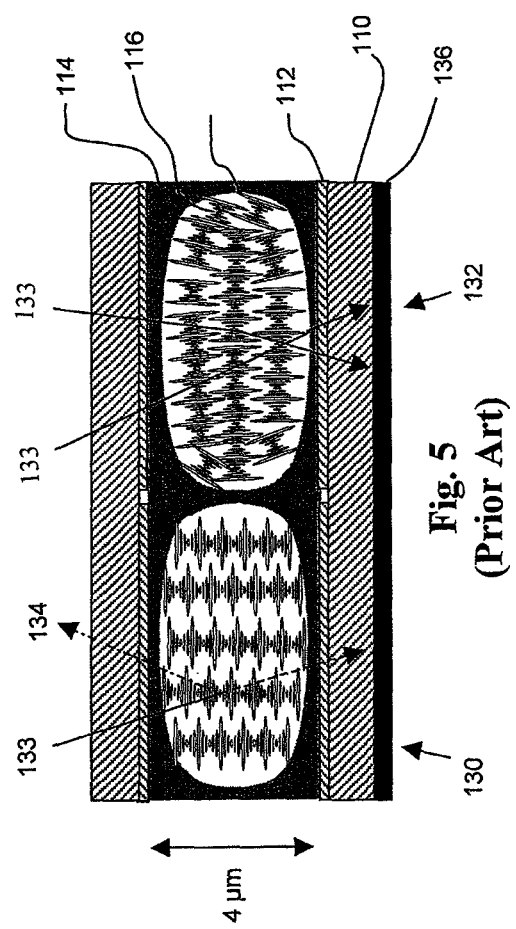
FIG. 5 shows a prior art reflective, bistable PDCLC film.

It was found that the scattering power of the focal conic texture in a PDCLC film can be increased from the weak, semi-transparent scattering state typical of reflective, bistable PDCLCs, see FIG. 5, to a strongly scattering polydomain texture that is stabilized in the OFF state, see FIG. 6, by applying the containment means defined herein. The efficacy of the containment means lies in the discovery that a discrete volume of cholesteric liquid crystal (a droplet 12), when confined in a polymer structure 14, has a range of volumes that possess the surprising property of stabilizing a polydomain texture in the OFF state.

It was found that the divergence of domains in a polydomain texture, stabilized by said containment means, can be optimized by applying what is referred to herein as "divergent surface anchoring" at a droplet's polymer/liquid crystal interface.

It was found that using cholesteric liquid crystal with a pitch longer than taught in the prior art (PSCT devices and reflective, bistable PDCLCs) has a number of important advantages. Preferably the cholesteric liquid crystal pitch is about 50% or more longer than the typical prior art pitch for normal-mode PSCT shutters of ≦0.8 micron.

It was found that PDCLC films having a long pitch—for example, 1.4 microns—have the following advantages in the OFF state over films having a short pitch—for example, 0.8 to 0.95 microns:

a) The maximum droplet volume having stabilized polydomain texture is greater; for example, its diameter (or major axis) is about double that of a 0.8 micron pitch film.

b) The phenomenon known as 'red-image bleed-through' where red light is scattered less than shorter visible wavelengths, is virtually eliminated. It is an undesirable characteristic of films having a pitch of about 0.9 micron or less.

It was found that deriving the liquid crystal pitch from chiral dopant having a Helical Twisting Power (HTP) magnitude >20, more preferably >30, further increases the upper volume limit of a droplet. The chiral dopant can be a single compound, or a mixture. Example 2 uses a single chiral dopant having a HTP of about 33.5, whereas example 3 used two dopants: one having a HTP of about −13.8 and the other a HTP of −33.5. Films having the formulations shown in these examples have an increased upper volume limit for droplets when compared to the formulation of example 1 whose chiral dopant has a HTP of about 13.8.

It was further found that the divergence of domains in a polydomain texture, stabilized by said containment means and optimized by said divergent surface anchoring, can be maximized by selecting the discharge rate of said PDCLC film as it transitions from the homeotropic (ON) state to the polydomain (OFF) state.

Turning first to the role surface anchoring plays in determining scattering power in the OFF state. It has been found that the scattering power of the focal conic texture in a PDCLC film can be maximized by achieving what is called herein "divergent surface anchoring" at the polymer/liquid crystal interface within droplets. Divergent surface anchoring can be achieved through polymer surface architecture (i.e., selection of monomers that result in the desired surface) as will be elaborated on later in this document.

Surface anchoring of a liquid crystal molecule at the interface with a droplet's polymer surface is where the director of a liquid crystal molecule exhibits a preferential alignment to that surface. If a droplet's polymer surface can induce substantially the same alignment—parallel alignment—in the majority of neighbouring liquid crystal molecules at the polymer interface then this is called herein "parallel surface anchoring". In the prior art examples of parallel surface anchoring are referred to as planar (i.e., where the long-range molecular alignment is parallel to the polymer surface), and homeotropic (i.e., where the long-range molecular alignment is perpendicular to the polymer surface and parallel to each other).

The prior art devices discussed earlier all have parallel surface anchoring. Reflective, bistable, PDCLC films have planar alignment of liquid crystal molecules at the polymer/liquid crystal interface within droplets. PDLC films typically have homeotropic alignment but can also have planar alignment. NCAP have planar alignment. In PSCT films the liquid crystal molecules at the interface with a polymer network formed from mesogenic polymer are homeotropically aligned.

In the present invention a new type of desirable surface anchoring has been found: "divergent surface anchoring". Divergent surface anchoring is where the majority of neighbouring liquid crystal molecules at the interface with a polymer surface do not have the same alignment in the axis normal to the local surface, rather their alignments diverge from one another. For example, one liquid crystal molecule may be at 60 degrees to the local polymer surface normal, its neighbouring molecule on one side may be at 25 degrees and its neighbouring molecule on the other side may be at 45 degrees.

To aid visualization, a liquid crystal molecule's alignment can be mapped on a rectangular Cartesian Coordinate System: the axis normal to the surface can be though of as the Z-axis, then the X and Y axes are in the plane of the surface. In this case a liquid crystal molecule parallel to the local surface lies in a plane parallel to the X and Y axes. A liquid crystal molecule can be thought of as a line segment: when parallel to the local surface all points along a molecule's line segment have the same Z axis co-ordinate; when lying perpendicular to the local surface all points on a segment have the same X and Y axes coordinates; and, when lying at an angle to the Z axis all points on a segment can have either the same X or Y axis co-ordinates, but not both, or have co-ordinates different in all three axes. The latter, a line segment with co-ordinates different in all three axes, is typical of the liquid crystal alignment of divergent surface anchoring.

Figure 4:
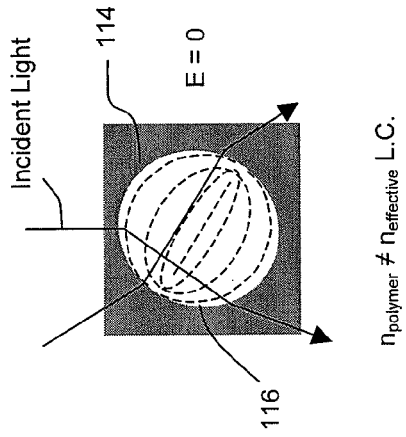
FIG. 4 shows a cholesteric liquid crystal helical structure.
Figure 2B:
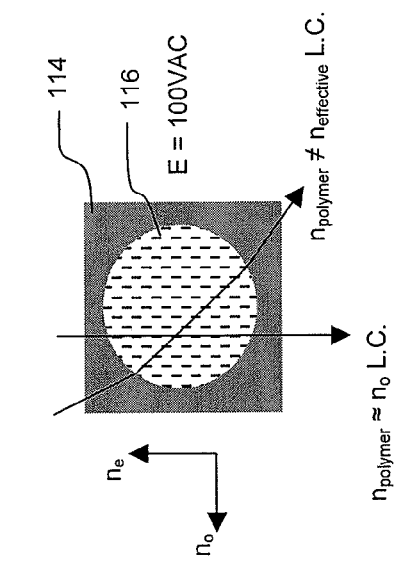
Figure 3:
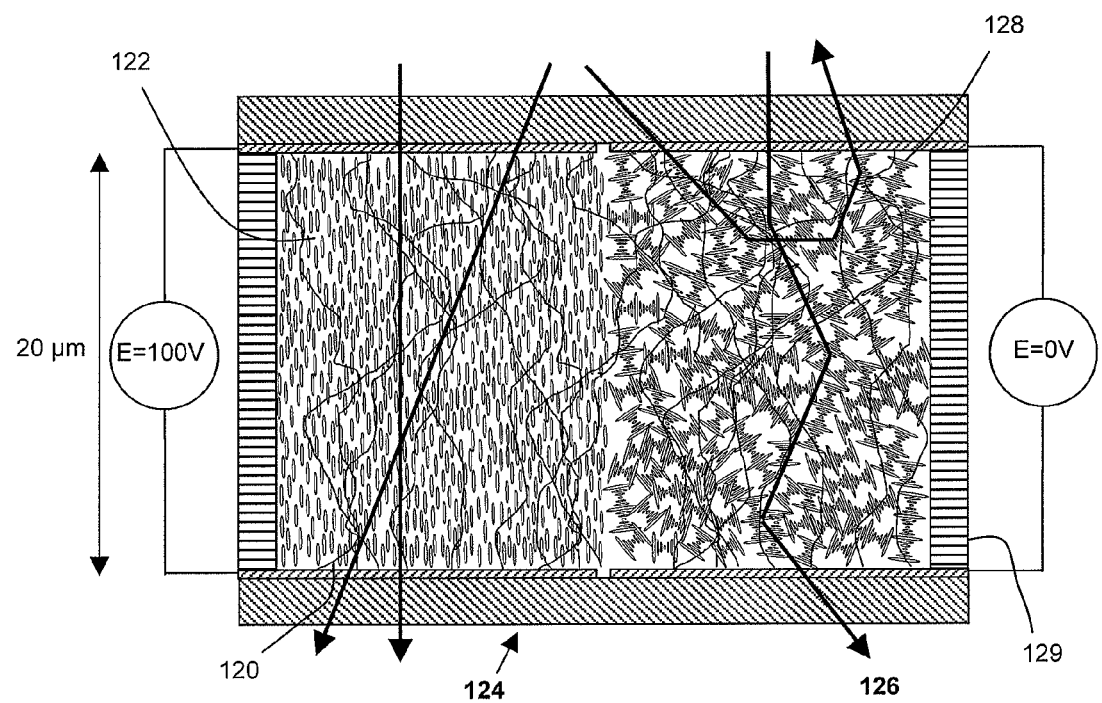
FIG. 3 shows a prior art PSCT film for normal-mode applications.

More precisely, parallel and divergent surface anchoring refers to the alignment of the end molecules of the cholesteric liquid crystal spiral structures—helices—at the polymer interface. The chirality forces in cholesteric liquid crystal impose helical structuring of its liquid crystal molecules—see FIG. 4. The minimum structure is half a helical pitch and the length is in increments of half pitches. In divergent surface anchoring the angle a helix's end molecule makes with the polymer surface has to be resolved between the competing forces of liquid crystal chirality and polymer surface anchoring in cases where the surface alignment would otherwise result in helices clashing due to space constraints. In the present invention, divergent surface anchoring refers to this resultant alignment of the end liquid crystal molecules of helices at the polymer interface.

Figure 10:
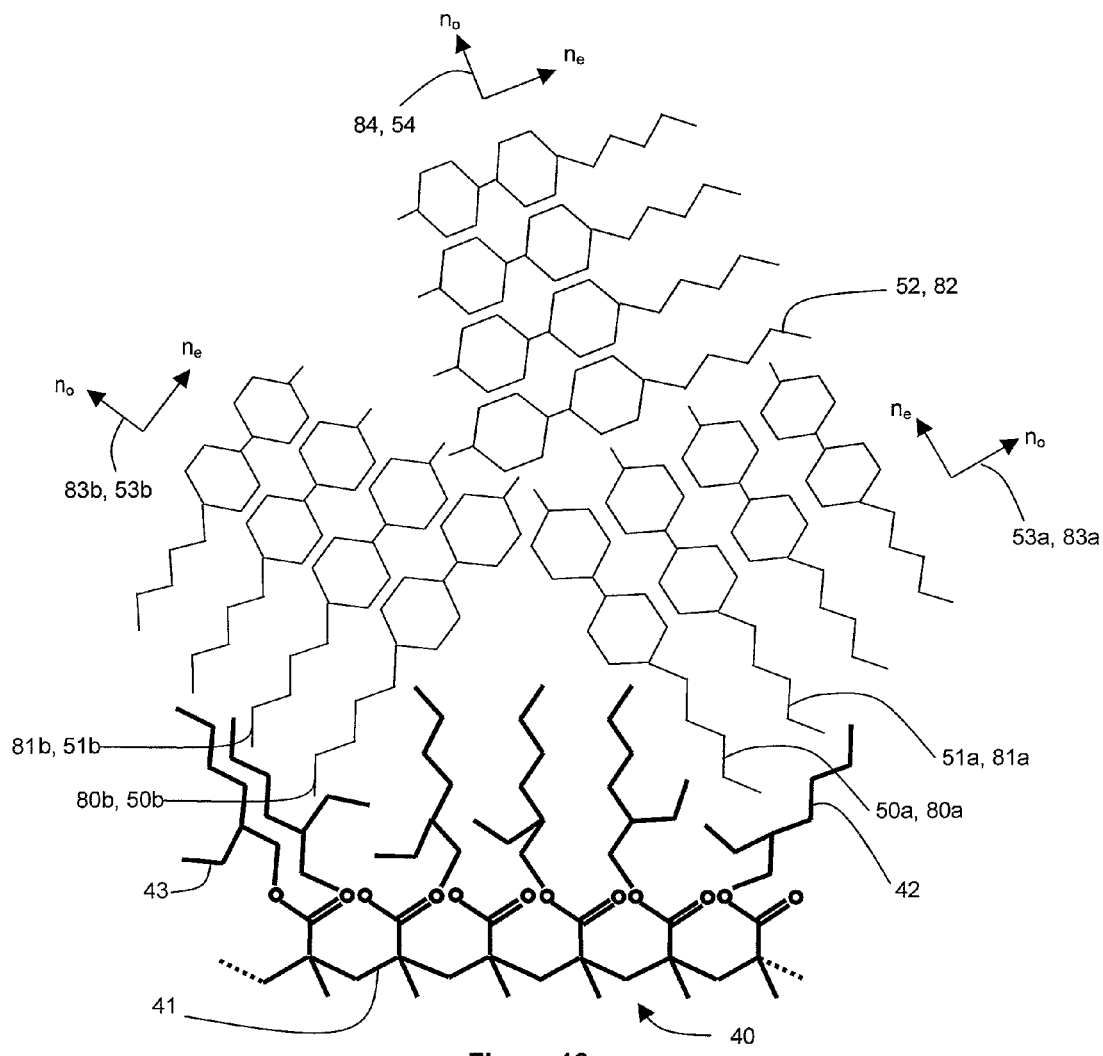
FIG. 10 is an example of the present invention's polymer surface architecture resulting in divergent surface anchoring.

FIG. 10 shows an example of the divergent surface anchoring of the present invention resulting from poly(2-ethylhexyl methacrylate) 40. The neighbouring, helical-end, liquid crystal molecules 50a and 50b diverge from each other. In their respective helical structures, molecules 51a and 51b are parallel. Within the liquid crystal bulk, end molecule 52 is forced to align differently to 50a and 50b as a consequence of the divergence of the helical structures containing 50a and 50b. The direction of the ordinary and extraordinary liquid crystal refractive indices of each of the three domains containing end molecules 50a, 50b and 52 are shown by 53a, 53b and 54 respectively. For any given angle of light, the effective refractive index of each of these three neighbouring domains will be significantly different to each other and cause light to scatter (i.e., refract) at their respective boundaries.

As the axis of a helix is perpendicular to its molecules (including its end molecule) then the axes of the helices at the polymer interface will tend to be parallel for substantially parallel surface anchoring and will tend to be divergent for substantially divergent surface anchoring.

Turning next to the containment means: on turning off the electrical field from the ON state, there is significant turbulence in the liquid crystal bulk as the collapsing homeotropic alignment of liquid crystal molecules is converted into helical alignment by the chirality forces of the cholesteric liquid crystal. It has been found that during this transitionary period the newly formed domains in the liquid crystal bulk are divergent and that this divergence can be captured, and stabilized by containment means, thereby creating a strongly-scattering, polydomain texture that persists over time. The containment means encapsulates a discrete volume of liquid crystal, whose volume falls within a range defined herein, in a cavity—referred to as a droplet 12—in a polymer structure 14.

Ignoring the role of a droplet's polymer surface for a moment, stabilization of the strongly scattering polydomain texture is though to come about through lack of freedom of movement in all axes experienced by domains (and the helices contained therein) if the axes of the physical container—the cavity in the polymer structure 14 that defines a droplet 12—are typically less than 30 times the helical pitch; or, stated alternatively, where the pitch length is significant with respect to the dimensions of the physical container encapsulating a volume of cholesteric liquid crystal.

An upper volume limit of a droplet 12 (i.e., the containment means) was found at the point where forces within the liquid crystal bulk dominate over the containment forces imposed by a droplet's volume, allowing the helical axes to move into less divergent alignments. For the large droplets typical of reflective, bistable PDCLC displays, and for a continuous layer of cholesteric liquid crystal, the resultant state is a weakly scattering focal conic texture.

A lower volume limit of a droplet 12 (i.e., the containment means) was found at the point where the volume is so small that the majority of domains have a polymer wall interface. In this case, a droplet's shape can dominate alignment of domains, and regardless there are insufficient domain boundaries within a droplet to create significant light scattering within droplets. The latter is the case for prior art PDCLC devices having the same droplet size as PDLC displays (i.e., 0.7 µm to 1.0 µm).

The upper and lower volume limits of a droplet 12 (i.e., the containment means) were found to be dependant on the helical pitch, and to a lesser extent on the HTP magnitude of the chiral dopant. As is known in the prior art the concentration of chiral dopant along with its HTP magnitude determine the helical pitch; for a given HTP, the lower the concentration the larger the pitch and so the longer the helical major axis. It is proposed that larger helices have less freedom of movement in a given droplet volume than smaller helices. While not wishing to be bound by this theory, it does explain why for example a PDCLC film of the current invention with a pitch of 0.8 to 0.95 micron has an upper droplet major axis limit that is about half that for a corresponding film having a pitch of about 1.4 micron. This theory also provides a reason why prior art reflective, bistable PDCLCs have poor scattering in the focal conic texture: the pitch in such devices is typically 0.25 to 0.44 micron, and so the helices enjoy far greater freedom of movement when compared to the PDCLC films of the current invention.

It came as a surprise that a polydomain texture can be stabilized over time by the containment means of the present invention. As discussed in the prior art section, known polymer means of stabilizing a polydomain texture involve the use of a fibrous polymer network that extends through the liquid crystal bulk (i.e., PSCT devices), but advantageously, the present invention avoids polymer altogether within the liquid crystal bulk as such polymer network or walls would provide additional polymer/liquid crystal interface surfaces that would contribute to haze in the ON state.

But employing containment means—discrete cavities/droplets within a polymer structure—whose volume is selected to be within the two limits defined herein, while stabilizing the liquid crystal domains in a divergent alignment, does not maximize the divergence of that alignment. To illustrate why this is the case the influence of the polymer surface alignment has to be considered. The parallel aligning influence of the polymer surface on liquid crystal domains near the surface acts to impose order and reduce domain divergence in the liquid crystal bulk in prior art PDCLC devices. Conversely, the divergent surface anchoring of the present invention reinforces, and may even assist in creating, substantially divergent domain alignment in the PDCLC devices of the present invention.

As a droplet's polymer surface becomes more defined by parallel rather than divergent anchoring, it acts as a counter force to the stabilizing force of a droplet's morphology because more uniform alignment of liquid crystal molecules at the polymer interface induces more uniform alignment of the helical axes that contain these molecules and consequently creates ordering forces within a droplet's liquid crystal bulk. This is analogous with planar (i.e., parallel) alignment creating planar texture in the liquid crystal bulk of reflective, bistable PDCLC devices, and contrasts with the disordering forces created by the preferred surface architecture of the present invention.

Furthermore, the more a surface becomes defined by parallel rather than divergent anchoring, the more likely that one: the helical axes of the liquid crystal will align resulting in larger domains in the polydomain texture thereby reducing the amount of boundary surfaces where light can be scattered, and two, that the angle between the helical axes of neighbouring domains will reduce thereby reducing the refractive index mismatch, and so, scattering power.

In the OFF state, divergent surface anchoring creates divergent domain alignment of the liquid crystal at the polymer interface, in turn these divergent domains cause or reinforce divergence of neighbouring domains within the bulk, and so on towards the centre of the bulk. Effectively, divergent domains are created both by the liquid crystal turbulence on turning off the electrical field, and the polymer surface as helices align at divergent angles to the surface.

It has been found that a PDCLC film having the droplet morphology of the present invention, and made with monomers resulting in substantially divergent surface anchoring, has higher stabilized scattering power than a corresponding film having similar droplet morphology but made with monomers resulting in substantially parallel surface anchoring.

It may not be possible to completely eliminate localized surface areas characterized by parallel surface anchoring because other factors have to be taken into account when choosing suitable monomers. For example, a minority of monomers that induce parallel surface anchoring might be added because they impart greater polymer matrix strength and adhesion to the substrates.

The shape of a droplet 12 is less important than its volume, but the shape is significant in terms of its impact on the total polymer surface area of a droplet (due to the aligning influence of the polymer surface), or where one of its axes is so short as to inhibit the formation of a significant liquid crystal bulk comprising multiple domains in the direction of that axes. The preferred shape is one that is broadly ellipsoidal, and the "pancake/flattened" shape (i.e., having one or more relatively planar surfaces) droplets of reflective PDCLCs is less desirable (see FIG. 5). It will be appreciated by a person of ordinary skill in the art that a PIPS process cannot be controlled to form perfect geometric forms; the references here to geometric forms are to be understood as meaning broadly recognizable or closest to a particular form.

Preferably for a given droplet 12, its largest axis is <3 times its smallest axis, and more preferable <2, and still more preferable two of its axes are approximately equal—spheroid shape.

Alternatively, a droplet may have a generally polygonal cross section in an axis parallel to the film surface.

It has been found that being discharged quickly can maximize the stabilized scattering power of PDCLC films of the present invention. The discharge rate is dependant on the helical pitch, and on droplet size. PDCLC films with a relatively short helical pitch (for example, a pitch of 0.8-1.0 micron) are the most sensitive: droplets having a maximum axis in the range of 2.5 to 4.0 μm are preferably discharged over 10 ms to 300 ms, and most preferably over 50 ms to 200 ms; for larger droplets, particularly greater than 5 μm, the discharge rate is preferably 0.5 ms to 10 ms, and most preferably 1 ms to 3 ms. By contrast, PDCLC films with relatively long helical pitch (for example, a pitch of 1.4 micron) simply benefit from a discharge of less than about 300 ms and there is no dependency on droplet size.

It is thought that the slow discharge typical of the prior art that simply disconnects (i.e., open circuit) the drive signal from a film does not create sufficient turbulence in the liquid crystal bulk in the transition from the homeotropic to focal conic textures to optimize the polydomain state. Unless stated otherwise, observations herein of scattering power are made following discharging of a PDCLC film at its optimum discharge rate.

The rate of discharge can be controlled simply by a resistor whose size is selected based on the capacitance (i.e., the area) of a PDCLC film, and the desired discharge time given said film's helical pitch. Preferably, the methodology of a Single Pole Double Throw SPDT switch is employed: electrode 11a (see FIG. 11) is connected to the SPDT switch's pole/common, the normally open contact is connected to the driving signal's "+" polarity, and the normally closed contact is connected through the discharging resistor to signal ground; and, electrode 11b is connected directly to the driving signal's "−" polarity. In this way the discharging resistor is out of the circuit when the PDCLC film is powered (switch thrown to the normally open position), but discharges the PDCLC film when not powered (switch thrown to the normally closed position).

Turning next to the clear/transparent (ON) state: the presence of a suitably strong electrical field causes the helical axes of the cholesteric liquid crystal of the present invention to unwind, the polydomains of the focal conic texture to disappear, and the liquid crystal molecules to align parallel to the electrical field (for liquid crystal with positive dielectric anisotropy), see FIG. 7. In this state the liquid crystal has a homeotropic texture, is highly ordered, and a droplet can be thought of as comprising a single liquid crystal domain.

Figure 1:
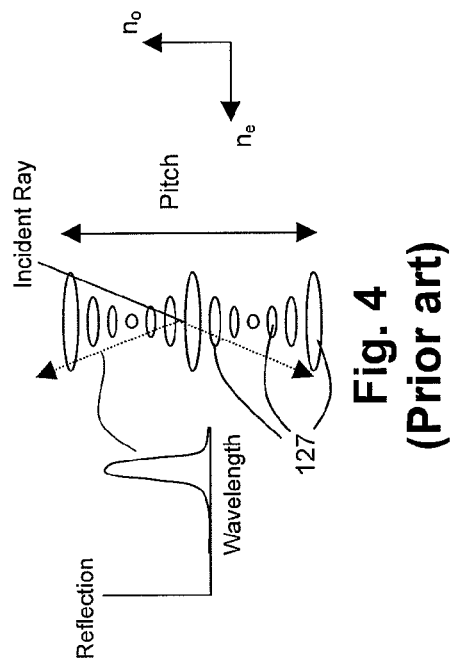
FIG. 1 shows a prior art PDLC or NCAP film for use in switchable window applications.
Figure 2A:
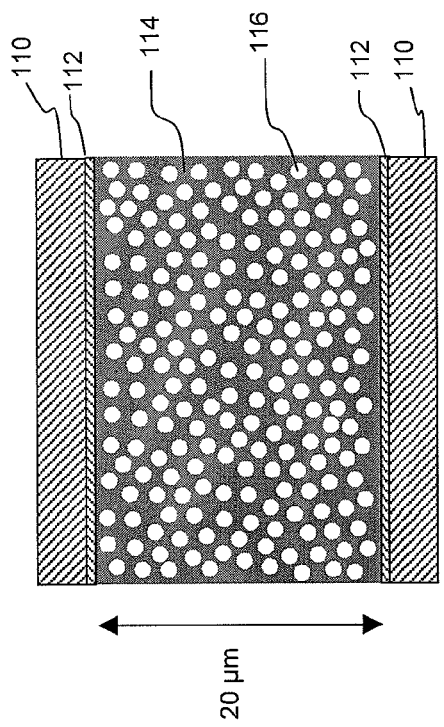
FIGS. 2A and 2B illustrate the operation of a droplet of LC material within the device of FIG. 1 in the ON and OFF states, respectively.

Comparing the PDCLC film in the ON state in FIG. 7 to prior art PDLC devices as shown in FIG. 1 (and a PDLC droplet in the ON state in 2A), a light ray normal to the film surface in FIG. 7 (e.g., ray 23) will encounter typically 1 to 3 droplets 12 as it passes through the PDCLC film. By contrast, a ray normal to a PDLC film will encounter typically 10 to 15 droplets.

It was found that minimizing the number of droplets (i.e., maximizing the droplet volume) significantly reduces the amount of haze for a given cell gap and liquid crystal birefringence, particularly haze at acute angles of view. In the ON state within a droplet the volume becomes a single domain with a common liquid crystal alignment, within this domain there is negligible scattering of visible light regardless of angle. As a droplet's volume is increased, ultimately to occupy an entire local space within a film, then that local space has negligibly haze regardless of angle. Consequently to minimize haze in the ON state a droplet's volume must be maximized.

Again comparing the PDCLC film in FIG. 7 (droplets 12 having a diameter of 5 to 10 micron or more typically) to the prior art PDLC film of FIG. 1 (droplets having a diameter of 1 micron), there is a 5 to 10 times increase typically in the major axis of a droplet, and the corresponding increase in volume (assuming a spherical shape—$4/3\pi r^3$) is 125 to 1,000 times, and the decrease in surface area for the same volume of liquid crystal is 5 to 10 times ($4\pi r^2$). Clearly the current invention has significantly less total interface surface between the polymer matrix and the birefringent liquid crystal than the prior art. As stated earlier, light refracts at the interface between the liquid crystal in a droplet (in the ON state a droplet is a single domain) and the polymer of the encapsulating matrix because there is a mismatch between the refractive indices of both materials, the liquid crystal being birefringent has a viewing angle dependant refractive index. The theory offered herein for minimizing haze is that by minimizing the total polymer/liquid crystal interface surface, and maximising a droplet's volume, the current invention minimizes haze, particularly for acute viewing angles.

It is highly desirable to use droplets whose size is towards the maximum size of the criteria disclosed, to use droplets that are more spherical in shape than ellipsoidal, and to avoid droplets completely whose largest axis is <1.5 μm as these contribute very little to scattering power but significantly to ON state haze at acute viewing angles.

It was found that PDCLC films having a long pitch—for example, 1.4 microns—have the following advantages in the ON state over films having a short pitch—for example, 0.8 to 0.95 microns:

a) As a consequence of being able to use a droplet diameter (or major axis) of about double a short pitch film (see earlier disclosure in relation to the OFF state) the number of droplets in a film is less, for example up to $\frac{1}{8}^{th}$ (calculation based on $4/3\pi r^3$), and the total interface surface between the liquid crystal and polymer matrix for the same volume of liquid crystal is up to ½ (calculation based on $4\pi r^2$). In the fully clear (ON) state this gives a further reduction in haze, particularly at acute angles.

b) The minimum voltage necessary to switch to the fully clear state (ON) is less; for example, about half that of a 0.8 micron pitch film.

The current invention discloses a range of values for the polymer/liquid crystal interface area corresponding to a centimeter square of viewing surface in terms of cell gap (X) and a film's LC fraction (Y):

Let X=a film's cell gap.
Let Y=LC weight/(LC weight+polymer weight), the polymer weight is the sum of the polymer components: monomer(s)+crosslinker+free radical initiator.
Assume spherical droplets.
Assume the sphere diameter equals a droplet's major axis, and 'r' is its radius.
Use the average droplet diameter, or in the case of droplets having more than one distinct distribution band, sum the area contributed by each band on a weighted basis.
Area expressed in units of $cm^2$.
The maximum surface area corresponds to a droplet's major axis of 2.5 micron, and the minimum surface area to a major axis of 35 micron.

FORMULA $$\text{Polymer}/LC \text{ interface area} = (\text{number of droplets}) \times (\text{a droplet's surface area})$$
$$= (\text{volume of } LC/\text{droplet's volume}) \times (\text{droplet's area})$$
$$= XY/(4/3\pi r^3) \times 4\pi r^2 (\text{units are cm}^2)$$
$$= 3XY/r (\text{units are cm}^2)$$

The maximum surface area of a PDCLC film is (2.5 micron droplet diameter):

$$\text{Polymer}/LC \text{ interface area} = 3XY/0.000125 (\text{units are cm}^2)$$
$$= 24,000 XY (\text{units are cm}^2)$$

The minimum surface area of a PDCLC film is (35.0 micron droplet diameter):

$$\text{Polymer}/LC \text{ interface area} = 3XY/0.00175 (\text{units are cm}^2)$$
$$= 1,714 XY (\text{units are cm}^2)$$

For example, if the cell gap is 35 micron, and a film comprises 60% liquid crystal and 40% polymer matrix, then the range for the polymer/LC interface area for such a PDCLC film is from 3.6 $cm^2$ to 50.4 $cm^2$. The corresponding interface area for a typical PDLC or NCAP film having an average droplet diameter of 1 micron is 126 $cm^2$.

In example 1 a 4.25 μm cell is haze-free (i.e., glass like) regardless of viewing angle; a 6.5 μm cell remains haze free for light rays 23 and 24, but there is a slight perception of haze as the acute viewing angle of light ray 25 increases (60°-90° from normal); and, a 10 μm cell has a slightly more haze than a 6.5 μm at acute viewing angles. But example 3 shows that a 14 micron film made with droplets whose major axis is about double that of the example 1 films had a similar level of haze at acute viewing angles to the 6.5 micron film in example 1 despite example 3 having significantly more scattering power (due to the increased cell gap) in the OFF state.

Comparing a 16 μm PSCT film made with mesogenic polymer network with a 6.5 μm PDCLC film (see example 1) of the present invention showed that both had a similar level of haze (i.e., very little) at acute angles (60°-90° from normal), but the PDCLC film had greater clarity for all other angles.

This is a surprising result as the PSCT film had <5% polymer in its polymer network, whereas the PDCLC film had 24% polymer in its polymer matrix and yet could achieve similar or superior optical clarity in the ON state.

Preferably the refractive index of the polymer matrix is matched to the ordinary refractive index of the liquid crystal, similar to the practice in PDLC films. As is known in the prior art, the refractive index of the polymer matrix has a liquid crystal component in its value as some liquid crystal is trapped in the polymer matrix during polymerization. Also, similar to practice in PDLC films, the refractive index of the polymer matrix can be matched to an intermediate value between the ordinary and extraordinary refractive indices of the liquid crystal.

The completeness with which the polymer phase separates, and migrates out of the liquid crystal and into the polymer matrix, during polymerization is also an important determinant of haze in the ON state. Any polymer aggregate that remains within a liquid crystal droplet after polymerization can disturb the ON state's homeotropic alignment locally thereby changing the effective refractive index of the liquid crystal locally, and for light rays travelling through the local area, also provide additional polymer/liquid crystal interfaces. Both of these phenomena will cause increased haze. For similar reasons, it is highly desirable to minimize polymer surface artefacts (i.e., polymer aggregates) attached to the walls of droplets and protruding into the droplets.

Irrespective of the presence of such trace amounts of polymer within the liquid crystal, it is crucial that the liquid crystal within a discrete droplet volume is free of any polymer in an amount sufficient to form any networks, walls or other structures inside a droplet volume. The domain boundaries within a droplet are defined by adjacent liquid crystal volumes and not by liquid crystal/polymer boundaries inside the volume of the droplet.

As is known in the prior art, liquid crystal displays can be operated to have "grey" states. PDCLC devices of the present invention can also be operated to exhibit a range of intermediate states between the polydomain (OFF) and homeotropic (ON) operating states, resulting in intermediate optical properties.

A wider range of intermediate states is available by using prior art methods of applying and maintaining an intermediate voltage level between zero volts and that required for homeotropic alignment. The domains and helices experience an electrical field and will alter their state according. The degree of converging of domains, or unwinding of helices, is controlled by the applied field, and thereby directly controls the degree of scattering (or transparency).

To minimize ON state haze, particularly for acute viewing angles, it is desirable to use the minimum cell gap possible that still satisfies an applications requirement for scattering power in the OFF state. In example 1 it was found that PDCLC films made in accordance with the present invention's requirements for droplet morphology and divergent polymer surface anchoring, have sufficiently strong scattering to block visual access through the film, or through glass, acrylic or polycarbonate laminates containing the film, for cell gaps $\geq 6.5$ µm. At a 10 µm cell gap, the scattering power of the present invention's PDCLC film can be equivalent to typical PDLC, NCAP or PSCT films having a 20 µm cell gap.

This innovation allows use of a significantly smaller cell gap in PDCLC films of the present invention to achieve comparable scattering power to prior art films with the consequences that less liquid crystal is required, costs are lowered, and operating voltage reduced.

Alternatively, to minimize ON state haze, the birefringence of a liquid crystal is minimized while maintaining the cell gap at prior art values: 20 to 25 micron typically. In this way the refractive index mismatch between the liquid crystal and the polymer at a droplet's interface is significantly lowered. Scattering power within a droplet is reduced because the refractive index mismatch between domains in the polydomain texture is reduced, but this is compensated for by the increase in the cell gap and so the number of domain boundary scattering sites in the polydomain texture.

As a consequence of these disclosures it will be obvious to a person of ordinary skill in the art that a PDCLC film of the present invention can be readily optimized to meet requirements for haze-free viewing and scattering power by varying the cell gap, and selecting liquid crystal with more or less birefringence as required.

The cell gap 16 is preferably in the range: 4 µm to 75 µm, and more preferably 5 µm to 25 µm.

Turning now to a selection method and precursors of the PDCLC films of the present invention including monomers, photoinitiators, nematic liquid crystals, and chiral dopants, and associated polymerization conditions for forming a layer of PDCLC material between transparent, conductive substrates.

A number of factors have to be taken into account in selecting suitable monomers/prepolymers including:
1. The polymerization process/general method to be used: emulsification or PIPS, and within PIPS the method to induce polymerization—thermally induced (TIPS), solvent evaporation induced (SIPS), or photoradically induced; the latter is the preferred method of the present invention;
2. The refractive index of the resultant polymer matrix, and the requirement to match it to the ordinary refractive index of the liquid crystal, or fall as an intermediate value between the ordinary and extraordinary indices as required;
3. The chemical structure of the monomers as it relates to the requirement for divergent surface anchoring at the polymer liquid crystal interface for the resultant polymer matrix (or the encapsulating wall in the case of emulsification);
4. The reactivity of each monomer/prepolymer: this includes both the reactivity of each monomer within a mixture containing the selected monomers, as well as the overall reactivity of that mixture;
5. The viscosity of the chiral nematic liquid crystal mixture—advantageously higher viscosity tends to slow polymerization thereby facilitating complete phase separation of the liquid crystal and polymer;
6. The desired mechanical properties of the polymer matrix structure: strength, flexibility, and adhesion to the substrates, and the role of each monomer in achieving this;
7. The solubility of the components in the overall mixture: a homogeneous single phase is preferred at the start of polymerization;
8. The viscosity of the overall mixture, particularly its compatibility with processing equipment;
9. The curing time for the PDCLC film and its compatibility with roll-to-roll manufacture, particularly where the requirement is to manufacture substantially continuous rolls of PDCLC film;

Polymerization Induced Phase Separation PIPS, cured photoradically, is the preferred method of the present invention. A photoinitiator is used that decomposes under UV radiation to produce free radicals that initiates chain-growth polymerization. As propagation proceeds, the polymeric chains grow in molecular weight and droplets of liquid crystal are excluded from the bulk via phase separation. These droplets coalesce forming larger droplets whose size is ultimately fixed at polymerization termination.

The polymer precursors comprise two or more unsaturated monomers and a photoinitiator. One or more of the monomers, in the minority by percentage weight, is multifunctional and is generally referred to as a crosslinker. The other monomer(s) is monofunctional. In the PIPS method the crosslinker is crucial to achieving dispersed liquid crystal droplets in a continuous polymer matrix. Without sufficient crosslinker in the polymer precursor the liquid crystal could remain in one or more large continuous phases similar to a PSCT device.

In conventional PDLC displays the precursors of the polymer matrix usually contain one or more thiol monomers and/or oligomers that act as the principle crosslinking agent. The other monomers are alkene (also known as olefin or vinyl) compounds and have lower functionality: acrylate types, especially as oligomers, are used in conventional PDLCs, but methacrylate types can also be used. An example of a commonly used precursor for the matrix of PDLC displays is Norland Products, Inc. optical adhesive NOA65. This consists of thiol monomer TMPTMP—trimethylolpropanetri(3-mercaptopropionate), commercial epoxy acrylate oligomer Ebecryl E270, acrylate monomers EHA—2-ethyl-hexanolacrylate—and HDDA—hexanedioldiacrylate, and commercial photoinitiator D 1173.

In additional to the thiol-type crosslinker system of conventional PDLC films there is also an acrylate/methacrylate crosslinker system, and this is the preferred type of the present invention, though by following the disclosures as laid out herein a person of ordinary skill in the art can equally apply the thiol-type crosslinker system.

The acrylate crosslinker trimethylolpropane triacrylate TMPTA is used as a polymer precursor in the bistable, reflective PDCLC films featured in "Flexible Encapsulated Cholesteric LCDs by Polymerization Induced Phase Separation", by Tod Schneider et al. in the Society for Information Display SID 05 Digest, pages 1568-1571. Ethyl methacrylate EMA is the monomer and Irgacure 651 the photoinitator.

In the present invention suitable acrylates and methacrylates have a variety of substituent functional groups that can be classified as linear alkyl, branched alkyl, aryl, alkylaryl, arylalkyl, multiple arylalkyl, alkylmultiplearyl, alkylcycloalkyl, cycloalkylalkyl, hydroxyalkyl, fluoroalkyl, fluoroaryl, alkylsiloxane, siloxanealkyl, siloxanearyl, and arylsiloxane groups. The selection of a particular acrylate or methacrylate for a particular mixture is accomplished using the criteria described herein.

Examples of acrylates for use in the present invention that have a plurality of functional groups and so potentially suitable as the crosslinker, whether as the sole crosslinker or in combination with other crosslinkers, in the polymer precursor are: diethyleneglycol diacrylate, 1,4-butanediol diacrylate, 1,3-butyleneglycol diacrylate, dicyclopentanyl diacrylate, glycerol diacrylate, 1,6-hexanediol diacrylate, neopentylglycol diacrylate, tetraethyleneglycol diacrylate, trimethylolpropane triacrylate, pentaerythritol tetraacrylate, pentaerythritol triacrylate, tripropyleneglycoldiacrylate, ditrimethylolpropane tetraacrylate, dipentaerythritol hexaacrylate, dipentaerythritol monohydroxypentaacrylate, urethane acrylate oligomers, and triacrylate oligomers.

Examples of methacrylates for use in the present invention that have a plurality of functional groups and so potentially suitable as the crosslinker, whether as the sole crosslinker or in combination with other crosslinkers, in the polymer precursor are: ethyleneglycol dimethacrylate, diethyleneglycol dimethacrylate, 1,4-butanediol dimethacrylate, 1,3-butyleneglycol dimethacrylate, dicyclopentanyl dimethacrylate, glycerol dimethacrylate, 1,6-hexanediol dimethacrylate, neopentylglycol dimethacrylate, tetraethyleneglycol dimethacrylate, 1,4-butanediol dimethacrylate, bisphenol-A dimethacrylate, trimethylolpropane trimethacrylate, pentaerythritol tetramethacrylate, pentaerythritol trimethacrylate, ditrimethylolpropane tetramethacrylate, dipentaerythritol hexamethacrylate, dipentaerythritol monohydroxypentamethacrylate and urethane methacrylate oligomers; styrene; aminostyrene; and vinyl acetate.

Examples of acrylates for use in the present invention that are monofunctional and so potentially suitable as the monomer, whether as the sole monomer or as a comonomer, in the polymer precursor are: ethyl acrylate, 2-ethylhexyl acrylate, 2-ethyl-hexanolacrylate, butylethyl acrylate, butoxyethyl acrylate, 2-cyanoethyl acrylate, benzyl acrylate, cyclohexyl acrylate, 2-hydroxypropyl acrylate, hydroxyethyl acrylate, 2-ethoxyethyl acrylate, N,N-diethylaminoethyl acrylate, N,N-dimethylaminoethyl acrylate, isooctyl acrylate, dicyclopentanyl acrylate, dicyclopentenyl acrylate, glycidyl acrylate, tetrahydrofurfuryl acrylate, ethylbenzyl acrylate, butyl acrylate, isobornyl acrylate, isodecyl acrylate, n-decyl acrylate, n-hexyl acrylate, 1-methylheptyl acrylate, octyl acrylate, 2-methylheptyl acrylate, lauryl acrylate, morpholine acrylate, phenoxyethyl acrylate and phenoxydiethyleneglycol acrylate.

Examples of methacrylates for use in the present invention that are monofunctional and so potentially suitable as the monomer, whether as the sole monomer or as a comonomer, in the polymer precursor are: ethyl methacrylate, methyl methacrylate, 2-ethylhexyl methacrylate, butylethyl methacrylate, butoxyethyl methacrylate, 2-cyanoethyl methacrylate, benzyl methacrylate, ethylbenzyl methacrylate, n-hexyl methacrylate, n-octyl methacrylate, n-decyl methacrylate, cyclohexyl methacrylate, 2-hydroxypropyl methacrylate, 2-ethoxyethyl methacrylate, N,N-diethylaminoethyl methacrylate, N,N-dimethylaminoethyl methacrylate, dicyclopentanyl methacrylate, dicyclopentenyl methacrylate, glycidyl methacrylate, tetrahydrofurfuryl methacrylate, n-butyl methacrylate, isobutyl methacrylate, tert-butyl methacrylate, hydroxybutyl methacrylate, hydroxyethyl methacrylate, isobornyl methacrylate, isodecyl methacrylate, lauryl methacrylate, morpholine methacrylate, phenoxyethyl methacrylate and phenoxydiethyleneglycol methacrylate.

The prepolymer monomers for use in the present invention are preferably acrylate or methacrylate liquid compounds that are miscible with chiral nematic liquid crystal and form a homogeneous solution prior to polymerization. Preferably, monomers are chosen in preference to oligomers or resins of these monomers to promote miscibility with the viscous chiral nematic liquid crystal.

The reactivity of each monomer within the prepolymer mixture, and the overall reactivity of the prepolymer mixture are very important in forming the correct polymer matrix morphology.

The reactivity ratios are a measure of the affinity for each reactive component (i.e. monomer) to react with each other reactive component. The monomer reactivity ratios are the ratios of the rate constant for a given radical adding its own monomer to that for it adding the other monomer. In a mixture of two monomers, if a monomer's ratio $r_{monomer}$>1 the monomer prefers to react with itself, and if $r_{monomer}$<1 it prefers to react with the other monomer(s). It follows that a monomer with a ratio >1 will be consumed in the polymerization reaction faster than a monomer with a ratio <1.

For example, the reactivity ratios for a mixture containing methyl methacrylate MMA and 2-hydroxyethyl methacrylate HEMA are $r_{MMA}$=0.62 and $r_{HEMA}$=2.03. This indicates that during polymerization of a mixture containing both, an MMA radical is less likely to react with another MMA monomer than with an HEMA monomer, and that HEMA is twice as likely to react with another HEMA monomer than with MMA. Taken together the ratios indicate that HEMA will be consumed faster than MMA. Measurement of reactivity ratios for copolymerization is well known in the prior art, and are discussed for example in Odian, Principles of Polymerization, $2^{nd}$ Ed., John Wiley & Sons, pages 425-430 (1981).

In the present invention, the reactivity ratio for a monofunctional monomer(s) with itself, in a mixture with the chosen crosslinker monomer, is preferably >1, more preferably >2.5, and most preferably >5. The latter means that the monofunctional radical is 5 times more likely to react with its monomer than with the crosslinker monomer. The crosslinker preferably exhibits very low reactivity with itself substantially preferring to react with the monofunctional monomer(s) in the polymer precursor. The reactivity ratio for the crosslinker monomer(s) with itself is: preferably <1, more preferably <0.4, and most preferably <0.20.

A crosslinker's percentage weight in the polymer precursor of the present invention can be approximated by taking into account its rate of consumption (based on the reactivity ratios), its molecular weight, and its functionality. As a general guideline to balance the PIPS reaction, the number of unreacted crosslinker groups and unreacted monofunctional monomer groups should maintain a near constant ratio, with both being present close to the end. It follows from this guideline that in the polymer precursor:

(Number of crosslinker reactions)(rate of monofunctional monomer reactions to crosslinkers reactions)=number of monomer reactions This equality yields the following ratio of crosslinker to monofunctional monomer for use as a guideline in the polymer precursor of the present invention:

(Crosslinker % weight/monofunctional monomer % weight)=(Molecular mass of crosslinker/molecular mass of monofunctional monomer)/(rate of monofunctional monomer reactions to crosslinker reactions*functionality of the crosslinker)

For example, if the reactivity ratio of the monofunctional monomer with itself ($r_{monomer}$)=6 and the crosslinker has negligible reactivity with itself, the molecular mass of the monofunctional monomer is 100 and the mass of the crosslinker is 200, and the crosslinker is trifunctional, then:

crosslinker % weight/monofunctional monomer % weight=(200/100)/(6*3)=1/9

Or restated as a ratio, the crosslinker % weight: monofunctional % weight=1:9 in the polymer precursor.

In the present invention, advantageously, the upper limit of the crosslinker's % weight is somewhat less (e.g. ≧10% less) than indicated by the preceding balanced system formula. This will ensure that mostly monofunctional monomer is present near the end of polymerization and so the polymer surface of droplets will be formed predominantly from monofunctional monomer. This is important to achieving the required surface architecture—divergent surface anchoring—through monofunctional monomer selection. It is also advantageous in that only the monofunctional monomer(s) needs to have its refractive index (or more accurately its resultant refractive index as it could have a trapped liquid crystal component in it) match the ordinary refractive index of the liquid crystal.

In the present invention, while the preceding balanced system formula is a guide to the crosslinker's % weight, the preceding paragraph discloses the crosslinker's upper limit, and its lower limit is determined by the capability of the polymer system to phase separate the liquid crystal into discrete droplets. For a given polymer percentage weight of the overall mixture, and a given Ultra Violet UV light intensity during curing, the crosslinker percentage weight must be sufficient to form droplets.

It has been found that there is a trade-off between polymer percentage weight, UV light intensity during curing, and crosslinker percentage weight. Preferably, the desired droplet morphology is achieved by the following steps:

1. Fix the polymer percentage of the overall polymer/liquid crystal solution. Preferably at a percentage between 20 and 30 by weight, and more preferably, between 21 and 25 percent.
2. Fix the photoinitiator percentage weight at close to its minimum level that still ensures a high conversion of monomer to polymer.
3. Use a long wave UV light source having peak energy about the 365 nm wavelength, and fix the light intensity level, and whether curing from one side or both sides. Preferably, at an intensity between 0.5 mW/cm$^2$ and 10 mW/cm$^2$. Preferably, films having a cell gap >10 micron are cured from both sides.
4. Increase the ratio (i.e., reduce the percentage weight) of crosslinker to monofunctional monomer starting at the ratio determined by the previous balanced system formula. Establish the upper and lower limits of crosslinker percentage weight that yield well formed, uniform, discrete droplets for a given polymer/liquid crystal mixture.
5. If necessary, repeat step 4 following changing the fixed value at either of steps 1, 2 or 3 to achieve the desired droplet morphology.
6. Once the upper and lower limits of crosslinker percentage weight are found, use its median value preferably.
7. Once step 6 is completed, varying the UV light intensity about the value fixed at step 3 varies the droplet size, and is useful in optimizing the optical quality.

To determine experimentally the upper and lower limits of droplet volume for a given materials formulation as disclosed herein, prepare films that scan a droplet's major axis length (i.e. diameter) and measure or make visual comparisons of scattering power in the OFF state. It was found that scattering power falls off rapidly below a minimum droplet volume or above a maximum droplet volume as defined herein. It is convenient to measure the transmitted haze level, for example, with a HunterLab ColorQuest XE, as an indicator of a film's scattering power.

In choosing the monofunctional monomer group to pair with the crosslinker(s), the initial chemical intuition is that a methacrylate/methacrylate pairing will have closer reactivity ratios than a methacrylate/acrylate pairing, or vice versa. This intuition relies on the nature of the reactive vinyl bond and its immediately adjacent bonded groups having a greater impact on reactivity than the —O— linked side groups more distant from the vinyl bond. Though this chemical intuition is no substitute for determining the reactivity ratios, it is a useful guide as to general compatibility of pairings.

In the present invention it was found that the overall reactivity of the polymer precursor must also take into account the viscous nature of the chiral nematic liquid crystal within the mixture. Advantageously, it was found that the slower reactivity of an acrylate crosslinker system over a thiol-type system, and the even slower reactivity of a methacrylate crosslinker system, is preferred. For similar reasons, monomers are preferred to oligomers or resins.

Next turning to the polymer surface architecture, or more specifically, the chemical structure of monomers as it relates to the requirement for divergent surface anchoring at the polymer/liquid crystal interface of droplets in the resultant polymer matrix. In accordance with the present invention, the polymer interface is substantially formed from monofunctional monomer as the crosslinker is used up near the end of polymerization but prior to forming the droplet surface. At the droplet surface the polymer molecules are chain linked, and their substituent functional groups (the substituent groups of the monofunctional monomer(s) in the polymer precursor) extend into the liquid crystal and are thought to interact at the molecular level with the liquid crystal molecules. This molecular level interaction at the interface is subject to chirality forces of the liquid crystal bulk as discussed earlier, and how these are resolved determines whether the resultant surface anchoring is classified as parallel or divergent.

As disclosed earlier, the substituent functional groups of monofunctional monomers can be classified as linear alkyl, branched alkyl, aryl, alkylaryl, arylalkyl, multiple arylalkyl, alkylmultiplearyl, alkylcycloalkyl, cycloalkylalkyl, hydroxyalkyl, fluoroalkyl, fluoroaryl, alkylsiloxane, siloxanealkyl, siloxanearyl, and arylsiloxane groups. As demonstrated by prior art PDLC displays, substantially parallel alignment of liquid crystal molecules (whether planar or homeotropic) is typical of most monomers' substituent functional groups, and substantially divergent alignment required in the present PDCLC film, particularly one leading to strongly scattering stabilized polydomain texture, cannot readily be achieved unless the selection methods contained herein are applied.

Within the preceding classifications preferred monomers for creating divergent surface anchoring, when substantially one monofunctional monomer creates a droplet's polymer surface, are those whose substituent functional groups preferably have long linear chains, $\geq 4$ carbon atoms; more preferably the substituent functional groups have both long chains, and one or more branched chains, and especially where the branch occurs at or between the second and antepenultimate linear carbon atoms; and most preferably the substituent functional groups have both long chains, and one or more branched chains occurring at or between the second and antepenultimate linear carbon atoms, and where the branch is a group having $\geq 2$ carbon atoms, for example 2-ethylhexyl methacrylate EHMA. The latter is the preferred monofunctional monomer of the present invention.

Figure 8:
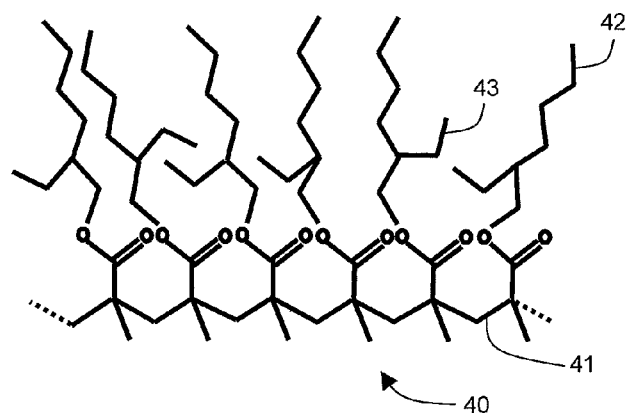
FIG. 8 shows the molecular structure of poly(2-ethylhexyl methacrylate)
Figure 9:
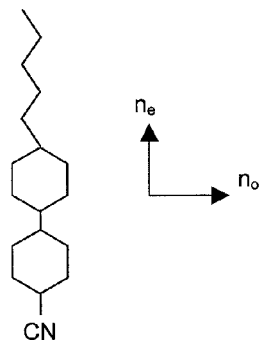
FIG. 9 shows the molecular structure of nematic liquid crystal 4'-Pentyl-4-biphenylcarbonitrile available from Sigma-Aldrich, and the direction of the ordinary and extraordinary refractive indices, for illustration purposes only.

FIG. 8 shows a droplet's 12 surface, poly(2-ethylhexyl methacrylate) 40, formed by polymerizing monofunctional monomer 2-ethylhexyl methacrylate EHMA. Numeral 41 indicates the polymer backbone; 42, the hexyl long linear carbon chain having 6 carbon atoms; and 43, the ethyl branch having 2 carbon atoms and occurring at the second carbon atom of the hexyl chain.

In FIG. 10 the substituent functional groups 42 and 43 of a droplet's polymer surface containing poly(EHMA) 40 are shown interacting with chiral nematic liquid crystal molecules 50*a* and 50*b* as described earlier. While a liquid crystal molecule can align parallel, perpendicular or at an angle to the polymer surface, the latter is the most probable for poly (EHMA) making it well suited to creating the strongly divergent surface anchoring of the present invention.

It is thought that EHMA's ethyl branch 43 forces neighbouring EHMA substituent functional groups to tilt due to steric effects thereby allowing a liquid crystal molecule to align at an angle to the normal to the local polymer surface. Steric effects arise from the fact that atoms within a molecule occupy a certain amount of space, and if atoms are brought too close together, there is a cost in energy due to overlapping electron clouds, and this may affect the molecule's preferred shape. The long hexyl chain 42 (6 carbon atoms) supports interdigitation of liquid crystal molecules when taken together with the ethyl branch 43 being at the second carbon atom (i.e., leaving 4 carbon atoms after the branch to interact with the liquid crystal molecule). The position of the ethyl branch at the second carbon atom is also thought to be significant in minimizing steric effects from the polymer backbone that otherwise would favour parallel alignment.

Advantageously, the monofunctional monomer component of the polymer precursor can contain more than one monomer. The additional monomer(s) in this case can play two different roles. The first role is where the additional monomer is added to improve physical properties of the PDCLC film such as greater strength, flexibility or adhesion of the polymer matrix to the substrates. In this role it is normally undesirable to have the additional monomer present in a droplet's polymer surface as a copolymer. By ensuring that the reactivity of the additional monomer is higher than the preferred monomer, and in a minority by % weight, the additional monomer will be substantially used up in forming the bulk of the polymer matrix, leaving only the preferred monomer near the end of polymerization to form the surface of the droplets. For example, it was found that adding isobornyl methacrylate IBOMA at up to 30% (by weight of monofunctional monomer) to EHMA (70%) improved peel adhesion of the polymer matrix to its film substrates while not degrading the scattering power in the polydomain texture. But if IBOMA is the majority monofunctional monomer, or the sole monofunctional monomer, then scattering power is degraded. In the latter case the PDCLC film has weak scattering power.

The second role of additional monofunctional monomer is where the additional monomer cooperates with the preferred monomer to improve or create divergent surface anchoring. In this role the reactivity of the monofunctional monomers must be similar so that both are present to form a copolymer surface at a droplet's liquid crystal interface. In the present invention monofunctional monomers used to create a droplet's polymer surface must cooperate to align neighbouring, or near neighbouring, liquid crystal molecules at divergent angles. Substituent functional groups extending into the liquid crystal from the polymer/copolymer backbone are characterized in that the substituent groups must support liquid crystal molecule interdigitation, and due to steric effects, must space apart or tilt substituent groups sufficiently to allow interdigitized liquid crystal molecules to tilt or assume an angle of preferably 10 to 80 degrees with the normal to the local polymer surface; more preferably 20 to 70 degrees, and most preferably 25 to 65 degrees.

As discussed earlier, the resultant angle a helix's end molecule makes with the polymer surface has to be resolved between the competing forces of liquid crystal chirality and polymer surface anchoring in cases where the surface alignment would otherwise result in helices clashing due to space constraints at the interface. The liquid crystal alignment produced by the polymer surface of the present invention—divergent surface anchoring—is not random, rather, as disclosed, it is the result of the interaction between the polymer's substituent functional groups, as selected in accordance with the present invention, and the liquid crystal molecules at the interface. It is highly probably that for a given alignment site on the polymer surface a similarly resolved divergent alignment is repeated each time the cholesteric liquid crystal transitions from ON (i.e., homeotropic and single domain) to OFF (i.e., focal conic and polydomain). It follows that a similarly divergent alignment of the helical axes at the polymer/liquid crystal interface of the present invention is achieved each time on transitioning to the OFF state, and so the alignment resulting from the surface anchoring of the present invention is not random. A similar, strongly-scattering, polydomain texture is achieved each time the PDCLC film of the present invention transitions to the OFF state, and it is stabilized in this strongly scattering state regardless of how long the duration of the OFF state.

It follows from the disclosures contained herein that in the polymer precursor of the present invention an acrylate or methacrylate crosslinker is preferred. Especially preferred is a methacrylate crosslinker. Most preferred is trimethylolpropane trimethacrylate TMPTMA. The preferred polymer precursor also contains one or more monofunctional methacrylates. Most preferred is 2-ethylhexyl methacrylate EHMA when employed as the sole monofunctional monomer. Advantageously, one or more additional monofunctional monomers, possessing a higher reactivity than EHMA, may be added to improve physical characteristics. Most preferred are isobornyl methacrylate IBOMA or ethyl methacrylate EMA at up to 30% by percentage weight of monofunctional monomer in the polymer precursor.

The photoinitiator added to the prepolymer can be any of the types suited to free-radical polymerization such as for example, benzoin methyl ether BME (available from Sigma Aldrich), or 2,2-dimethoxy-1,2-diphenylethan-1-one known as Irgacure 651 (available form Ciba Speciality Chemicals), or any other photoinitiators from the Irgacure family such as 184, 819 or 907. Preferably the photoinitiator is added at the rate of 1-10% by weight of the monomers (i.e., including crosslinker and monofunctional monomer); and more preferably at 1.125-3%.

Turning next to the cholesteric liquid crystal for use in the present invention. Any cholesteric liquid crystal mixture from the prior art is potentially suitable. Alternatively, any liquid crystal that, whether solely or when doped with additives, exhibits focal conic texture in one state and homeotropic texture in another state, is also suitable, as are mixtures of different phases of liquid crystal where the resultant mixture can be operated to exhibit such states. An example of the latter from the prior art is a minority of chiral smectic C liquid crystal mixed with a majority of cholesteric liquid crystal.

Though cholesteric liquid crystal molecules that exhibit chirality can be used, chiral nematic liquid crystal mixtures are preferred. In the latter a chiral dopant is added to a nematic liquid crystal to create the helical twist ordering (ie. cholesteric phase) characteristic of cholesteric liquid crystal. Varying the concentration of chiral dopant to nematic liquid crystal varies the pitch of the resultant helices. The shorter the pitch, the greater the twisting power required, and so the higher the chiral dopant concentration. But, chiral dopants have significantly higher viscosity than nematic liquid crystals, so there is a trade-off between cholesteric liquid crystal viscosity and pitch length.

The cholesteric liquid crystal of the present invention is preferable tuned so its peak reflection wavelength is in the infrared range, in this way it does not reflect visible light (i.e., it is transparent to visible light). More preferably, the cholesteric liquid crystal is tuned so its peak reflection wavelength >1 micron, more preferably >1.5 micron, and most preferably >2 micron.

From the prior art, the relationship between the maximum reflected wavelength and helical pitch for normally incident light is:

$$\lambda = np$$

where n is the average refractive index of the nematic liquid crystal. Pitch is determined by the Helical Twisting Power HTP magnitude of the chiral dopant and its % weight in the mixture with nematic liquid crystal, and is given in the prior art by the formula:

$$p = 1/(HTP \times c)$$

where HTP is the proportionality constant of the chiral dopant (units are micron$^{-1}$), and c is its concentration.

HTP can have a positive or negative value depending on whether right-handed or left-handed twisting is used. In the current application either can be used once all dopants added have the same sign, what is important is the magnitude of the HTP and not its sign.

Suitable chiral dopants and nematic liquid crystal compounds are readily available commercially from a number of sources, and will be known to those of ordinary skill in the art. For example, the earlier cited U.S. Pat. No. 7,023,600 lists the chemical composition of suitable nematic liquid crystal compounds, and chiral dopants, as well as listing commercially available products and sources. Similarly, both the chemical composition of suitable compounds and commercially available products and sources are listed in U.S. Pat. No. 7,119,859. In the latter case they are disclosed for use in a reflective, bistable PDCLC devices prepared by the emulsification method.

Turning next to the substrates for use in the present invention. Any transparent flexible plastic substrate—indicated by numerals 10a and 10b in FIGS. 6 and 7—coated with a transparent electrically conductive surface—11a and 11b— on the side facing the PDCLC layer is suitable, and will be known to those of ordinary skill in the art. A comprehensive list of suitable plastic substrate materials, and suitable transparent conductive materials is disclosed in the earlier cited U.S. Pat. No. 7,119,859 for use in flexible display applications. Similarly, prior art glass and/or rigid substrates coated with a transparent electrically conductive coating can be used for conventional display applications. Polyethylene terephthalate PET substrates coated with indium tin oxide ITO conductive surface are preferred for use in the applications contemplated herein because such films are readily available commercially from a number of sources, are very cost competitive, and compatibility with switchable window applications has already been demonstrated. Exemplary PDCLC films prepared herein used substrates known by the trademark OC (an optically clear PET film coated with ITO) and supplied by CPFilms, Inc. A range of substrate thickness and ITO resistivity are available: preferred are 100 μm-175 μm and 40-300 ohms/square respectively. Advantageously, optical coatings may be applied under the ITO layer to reduce light reflectance. Other functional coatings such as a barrier layer, insulating layer, alignment layer or hard coat may also be applied to the substrate film as are known in the prior art.

Turning next to spacers (not shown in FIGS. 6, 7 and 11) for use in the present invention to space apart the substrates and control the thickness of the PDCLC layer in a PDCLC film. Any transparent spherical spacer suitable for use in liquid crystal display applications can be used, and will be known to those of ordinary skill in the art. Exemplary PDCLC films prepared herein used high precision plastic spacers under the trademark Micropearl SP available from Sekisui Chemical GmbH. Depending on the production method used, the spacers can be applied before filling with the polymer/LC mixture (typical for glass and rigid substrates), or mixed with the polymer/LC mixture prior to laminating between film substrates. The latter is the preferred method. Preferably the % weight of spacer in the polymer/LC mixture is in the range 0.1%-10%; more preferably 0.25%-5%, and most preferably 0.5%-3%.

Turning next to the need to achieve a single homogeneous phase for the polymer/liquid crystal mixture. The polymer precursor—crosslinker(s), monomer(s) and photoinitiator— may be prepared separately and added to the liquid crystal mixture, or both can be prepared at the same time. Advantageously the mixture may be heated sufficiently to dissolve any solids completely, for example, a photoinitiator or a chiral compound may be in crystalline form on adding to the mixture. Prior art mixing methods include vortex, shaker, and ultrasonic mixing. The mixture may be filtered if required to remove any possible aggregate, and then spacer material added and thoroughly mixed depending on the fabrication method. Following mixing, the mixture is degassed to remove air (e.g., by placing in a vacuum chamber). The mixture is then ready for lamination between substrates.

Turning next to the method to laminate the PDCLC layer between substrates. Any known method for coating/laminating liquid crystal material, and in particular PDLC, NCAP or PSCT material can be used. For example, the PDCLC mixture of the present invention may be first coated onto one substrate by methods such as doctor blade, gravure coating, curtain coating, die-coating, printing, or screen printing, and then the other substrate may be laminated to the coated substrate. Alternatively, the PDCLC layer can be simultaneously laminated between film substrates as disclosed in the earlier cited U.S. Pat. No. 6,049,366. In all these methods the PDCLC mixture is preferably precisely metered along the coating/laminating head to ensure sufficient flow of material but avoid wastage. If rigid substrates are used such as glass, the PDCLC mixture can be vacuum filled by conventional means.

The laminated PDCLC layer is polymerized with UV light whose peak intensity preferably matches the absorption profile of the photoinitiator. Advantageously, the PDCLC film of the present invention does not require an electrical field to orient the liquid crystal molecules during polymerization. This greatly facilitates curing the film in a substantially continuous roll as the need for electrical connection and device isolation during curing is avoided. By contrast, many prior art PSCT devices require the presence of an electrical field during polymerization necessitating the curing of the film in device/sheet form as opposed to a substantially continuous roll.

Once polymerized, the liquid crystal is encapsulated in the form of discrete droplets within a continuous polymer matrix. Advantageously, a PDCLC device of the present invention can be cut from a polymerized roll to the required size by known methods such as hand cut by scissors/shears, cut on a slitter table, or laser cut. Typically, only 1-3 droplets in width are affected by the cutting action leaving a device fully functional up to its cut edge, and, inherently sealed. The PDCLC film of the present invention is robust, flexible, and typically can withstand bending from a corner, or being rolled up on a core diameter of 100 mm or more. These and other mechanical advantages of liquid crystal dispersed in discrete droplets in a continuous polymer matrix will be known from prior art PDLC and NCAP films.

It will be appreciated by a person of ordinary skill in the art that the fabrication process described: laminating a PDCLC layer between two film substrates, and exposing to UV light to polymerize the layer, is fully compatible with production as a substantially continuous roll in what is sometimes referred to as "roll-to-roll" manufacture. The term "substantially continuous" refers to the need for a finite roll length. Preferably, two rolls of substrate film are unwound continuously under tension and simultaneously feed to a coating station where the PDCLC mixture is precisely metered and a uniform PDCLC layer is formed between the substrates whose cell gap is precisely maintained by spacers, and this prepolymerization laminate is fed directly to an inline UV curing station with sufficient travel (given line speed) and light intensity to fully cure the PDCLC layer, and the cured PDCLC film is wound onto a receiving roll under tension.

The PDCLC film/glass laminate applications contemplated herein, and sometimes referred to as switchable windows, can be prepared using prior art methods. A sheet of PDCLC film can be cut from a roll of such film to the window size required. Methods to provide electrical connection ledges on a PDCLC film are similar to prior art PDLC devices. A connection ledge can be made by slitting one substrate to the required width for a connection ledge at one end of the film, peeling off the slit section of substrate to reveal the PDCLC layer beneath, wiping away the PDCLC layer to expose the ITO surface of the other substrate with a wipe soaked in isoprop alcohol or similar, printing and curing a conductive layer on the exposed ITO, and bonding a copper or other suitable buzz-bar to the conductive ledge thus prepared to facilitate attachment of an electrical cable and distribution of an electrical signal uniformly along the length of the connection ledge. The window film may then be switched between opaque and transparent to confirm its optical quality.

Figure 11:
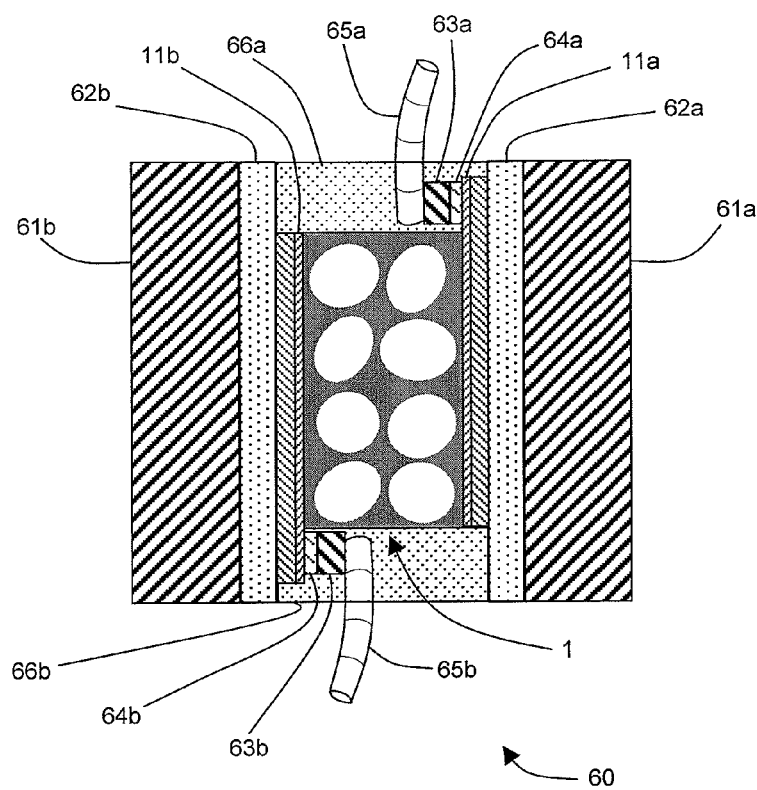
FIG. 11 is a cross sectional view of a glazing structure incorporating the PDCLC film of the present invention.

FIG. 11 shows a glazing structure comprising PDCLC film 1 laminated between glass panes 61a and 61b. On opposing sides, connection ledges are prepared: copper or other highly conductive flexible material, 63a and 63b, is bonded to ITO surfaces 11a and 11b respectively via conductive adhesive and/or conductive ink 64a and 64b; polarized driving signals can be applied to the PDCLC film via bonded/soldered cables 65a and 65b respectively.

The PDCLC film of the present invention can be laminated to a regular window glass pane on one or both sides by employing an adhesive sheet known as an interlayer. In FIG. 11, the PDCLC film 1 is laminated on both sides to glass panes 61a and 61b via interlayers 62a and 62b respectively. The interlayer can be polyvinyl butyral PVB, ethylene-vinyl acetate EVA or polyurethane PU, and advantageously incorporates a UV blocking function. Preferably, an EVA interlayer is used as these have the lowest maximum processing temperature. A vacuum-bag glass laminating process is preferred over an autoclave. Suitable interlayer films for use with the present invention include EVASAFE from Bridgestone Corporation, Japan, and SLEC from Sekisui, Japan. Process guidelines for laminating PET films (i.e., the preferred substrate material of the present invention) to glass are available from both suppliers. The resultant glass laminates made with PDCLC film in accordance with the present invention are free of discernable glass laminating related defects, have not suffered any objectionable optical degradation as a consequence of glass lamination, and possess suitable robustness in all window sizes. In summary, the PDCLC film of the present invention is well suited to the applications contemplated herein.

It will be appreciated by a person of ordinary skill in the art that if an emulsification system is used instead of the PIPS system as preferred herein (analogous to NCAP versus PDLC), then the surface of the liquid crystal encapsulating wall preferably provides divergent surface anchoring at its interface with the liquid crystal as disclosed herein. Furthermore, the resultant encapsulated liquid crystal droplets in the polymer binder/matrix are preferably as disclosed herein in relation to droplet morphology. Exemplary emulsification systems used in NCAP devices are disclosed in EP 0,238,164 and U.S. Pat. Nos. 4,435,047, 4,806,922, and 4,732,456. As discussed earlier U.S. Pat. No. 6,556,262 uses an improved emulsification system in its reflective, bistable PDCLC device.

But, the preferred application of the device of the current invention to an emulsification type process is where the liquid crystal is first encapsulated by polymer in shells/balls (hollow spheres having a skin of polymer and liquid crystal encapsulated therein), subsequently the LC shells are mixed with prepolymer components that form the polymer matrix thereby becoming a suspension prior to coating onto the substrate(s). An exemplary emulsification system is disclosed in U.S. Pat. No. 5,976,405 for PDLC devices. The advantages for the device of the current invention include:
 a) The LC shells form naturally into the shape of a sphere, and this geometric shape has the advantage that it posses the minimum LC/polymer interface surface area for a given droplet volume.
 b) The LC shells polydispersity can be controlled so that all shells fall within the desired range of diameters as disclosed herein. For example, if necessary outlying LC shells can be removed by filtering.

c) The LC/polymer interface (the inside surface of the shell wall) can comprise different polymer to that of the surrounding matrix in a film. This gives greater flexibility to optimize both.

In the preceding description of the present invention's PDCLC devices the opaque state (i.e., the polydomain texture) has been described as light scattering. It is known that the light scattering state of normal-mode cholesteric devices can be converted to a partially or substantially light blocking state by the addition of a small amount (0.5%-5%) of dye, preferably dichroic dye, to the liquid crystal mixture in accordance with the absorption profile of the added dye. For example, black dichroic dye will give a dark, light absorbing, opaque, OFF state. The corresponding homeotropic texture can have a slight colour tint due to the dichroic dye but remains transparent as the dye molecules' long axes are aligned parallel to the liquid crystals' long axes (i.e., the liquid crystal director). The advantages of dye use in the films of the present invention are two fold: creation of a light blocking state analogous to a conventional blind/shutter, and two, increased contrast in devices used to display information or images.

In the OFF state, a dichroic dye molecule will take the place of a liquid crystal molecule in a helical structure. Advantageously, the substantially divergent alignment of domains in the present invention ensures that the alignment of dichroic dye molecules in neighbouring domains is also substantially divergent thereby promoting uniform light absorption regardless of viewing angle. Furthermore, light scattering at domain boundaries works efficiently with light absorption within domains (by dichroic dye molecules) to both reduce light transmission (i.e., block) and deny visual access (i.e., scatter light) in the OFF state.

The addition of a small percentage (about 0.5%) of either dichroic or isotropic dye to a liquid crystal mixture can reduce the perceived haze, especially at acute viewing angles, in the homeotropic state. It is known that the addition of dye can change polymerization conditions, particularly in a photo-radical PIPS system. The dye will absorb UV light and so necessitates adjusting the UV exposure conditions to take account of this. In addition, any dye molecules that do not phase separate from the polymer (i.e., are not in solution with the liquid crystal within droplets) during polymerization can have a random alignment in the polymer matrix and can absorb light equally in the focal conic and homeotropic textures.

While the preceding described the additional functionality obtainable by the addition of dye to the liquid crystal mixture, any known materials that add functionality can be used in the present invention. Similarly, any known materials that add functionality to the polymer can be added to the polymer precursor in the present invention.

EXAMPLES

The invention will now be described with respect to specific exemplary examples. These examples are intended to be illustrative only and are to be understood as not limiting the invention disclosed herein in any way as to materials, or, process parameters, equipment or conditions.

Unless otherwise noted, all examples were carried out at 14 to 16° C. and 50 to 60% relative humidity. To avoid dust contamination, the PDCLC films were prepared in a class 1,000 cleanroom. All percentages and parts are by weight. The UV light source was an array of Philips black light tubes—F40T12/BL—outputting long wave UV light with a peak at about 365 nm. Measurements of UV intensity were taken at the PDCLC device, which was located 160 mm from the tubes. The PDCLC devices were cooled by circulating air to minimize any heating by the tubes during curing. The UV intensity during curing was measured by a Research Radiometer model IL1700 fitted with a SED400 detector and filter and optics having a peak response at 365 nm.

The substrates were 175 μm PET coated with ITO having a resistivity of 80 ohm$^2$/cm. The product used was OC80 supplied by CPFilms, Inc. California, US. The spherical spacers were from Sekisui Chemical's Micropearl range. The connection buzzbars were copper foil tape with conductive adhesive, available from 3M, part number 1181. All liquid crystal components were supplied by Merck KgaA, and all monomers and photoinitiators were supplied by Sigma Aldrich (www.sigma-aldrich.com).

Each polymer/liquid crystal solution was prepared in the same way using the following steps:
1. The polymer components were first added to a 40 ml glass vial in order of decreasing weight, then the liquid crystal components.
2. The resultant solution was heated to 70° C. and put on a vortex shaker for 1 minute.
3. Plastic spherical spacers were added to the solution at about 1% of the solution weight (before adding spacer).
4. An ultrasonic sonifier was used for 4 minutes to disperse the spacer, and achieve a homogeneous solution.

The solution (following spacer addition and dispersion) was laminated between the PET substrates as follows:
1. Two, equal-sized, OC80 PET substrates were cut to approximately 100 mm×200 mm. Other than this, the substrates required no other preparation.
2. One substrate was placed on a planar (within 0.0125 μm flatness over surface), aluminium plate with its ITO coated side facing up.
3. A bead of solution was pipetted onto the ITO coated side along a starting edge but about 1 cm in from the edge of the PET. This provided an offset for a connection ledge.
4. The second substrate (ITO side down) was lowered over the first with one edge aligned with the bead of solution, and coming into contact with the solution.
5. The bead of solution was then simply rolled down between the substrates using a silicon-coated, hand roller to laminate a thin (thickness is determined by the spacer diameter in the solution) layer of solution between the PET substrates. Excess material was cleaned off with a dry wipe.

The laminated display was then cured at the UV light intensity level indicated in each example for 10 minutes. Following curing, a 3M copper foil was bonded to the connection ledges provided by the offset substrates. To inspect the films an AC, square-wave generator was used having variable voltage amplitude (a variac can equally be used to supply AC sinusoidal driving signals). Simply having a resistor in the discharge path as disclosed earlier varied the discharge time. An oscilloscope was used to measure the discharge time.

To provide a reference for viewing the clarity of the PDCLC devices, two OC80, PET sheets were laminated together using 25 μm thick optical adhesive. By placing this reference side-by-side with the example PDCLC films, subjective observations of the quality of the PDCLC devices were made. This was particularly useful at acute angles where reflections from the ITO coating are significant and had to be ignored, as these were not attributable to the PDCLC layer.

A PDCLC film was laminated to glass following inspection, as follows:
1. Two glass panes were cut about 3 mm larger all around than the film to be laminated, and then had their edges polished and surfaces cleaned.
2. Two EVA interlayers—SLEC from Sekisui Chemicals GmbH—were cut slightly larger than the glass size.
3. The PDCLC film was sandwiched between EVA interlayers and glass panes. Care was taken to ensure than the copper strip on each connection ledge was sufficiently long to extend beyond the glass. These were the connection points for applying an electrical field after glass lamination.
4. The interlayer manufacturer's standard procedure was followed to complete the lamination process. For example, a vacuum bag was used to facilitate evacuating air from the glass laminate and maintain the laminate at a vacuum level of 175 Torr during the procedure. The peak laminating temperature was 100° C., and the laminate remained under vacuum until it had cooled to 70° C.

Example 1

Three solutions containing 24% polymer were prepared. The monofunctional monomer was 2-ethylhexyl methacrylate EHMA, the crosslinker was trimethylolpropane trimethacrylate TMPTMA, and the photoinitiator was benzoin methyl ether BME. TMPTMA was at 10% of the total polymer components by percentage weight.

The liquid crystal was a mixture of nematic type MDA-00-3506 and cholesteric mixture MDA-01-1995. The resultant pitch lies in the range 0.85 to 0.95 micron, and the peak reflection wavelength (see earlier formula) lies in the range 1.4 to 1.56 micron. The HTP of the chiral dopant in MDA-01-1955 is believed to be about 13.8. The liquid crystal birefringence is about 0.25.

A 3 g solution containing 4.25 μm diameter spacers (the cell gap equalled the spacer diameter) was prepared. The weights of the components was as follows:
EHMA=0.633 g
TMPTMA=0.072 g
BME (@1.95%)=0.014 g
MDA-00-3506=1.573 g
MDA-01-1955=0.708 g
4.25 μm spacer=0.031 g After a pair of PDCLC films was laminated, they were cured at a UV intensity of 6 mW/cm$^2$ for 10 minutes. Similarly, pairs of 6.5 μm and 10 μm PDCLC films were prepared (all components in the same proportion, except that the spacer weight was increased from 1% to 2% of the solution). The 6.5 μm films were cured at 5 mW/cm$^2$ for 10 minutes, and the 10 μm films at 6 mW/cm$^2$.

A 4 cm$^2$ area was cut from one of each of the three pairs using a sharp scissors. The remaining film area in each case was switched to the ON state: the 4.25 μm and 6.5 μm films were powered at 50 VAC, and the 10 μm film at 60 VAC. The films were fully functional up to the cut edges, and no liquid crystal leaked from the edges. Observations of droplet size were made using a microscope with a polarized light source. The 4 cm$^2$ film samples were peeled apart and the liquid crystal cleaned from ruptured droplets in the polymer structure using an alcohol solvent.

All three films had well formed droplets, showed good uniformity of size, and there were no signs of polymer aggregate within droplets. About 75% of droplets ranged from 4 to 6 μm for the 4.25 μm cell gap film, from 3.5 to 5 μm for the 6.5 μm cell gap, and from 4.5 μm to 7 μm for the 10 μm cell gap.

When the ON state of the three films were compared with the reference film (PDCLC layer substituted with optical adhesive) it was found that there was no perception of haze except for a very low level when viewing almost parallel to the film surface for the 4.25 μm PDCLC film. Similarly the 6.5 μm film remained haze free for light rays 23 and 24, but there was a slight perception of haze as the acute viewing angle of light ray 25 increased (60°-90° from normal). The 10 μm film performed equally as well as the other two when viewed normal to the surface but had slightly more haze than the 6.5 μm film at acute viewing angles. It was found that the perception of haze at acute viewing angles increased slowly with increasing cell gap.

By contrast, it was found that the scattering power increased greatly with increasing cell gap. Observations of the scattering power of all three films was made following discharging from the homeotropic (ON) state to the polydomains state in 2 ms (from 80% full scale to about 0V). The 4.25 μm film did not have sufficient light scattering to block visual access through the film. The 6.5 μm film was judged to have almost twice as much scattering power as the 4.25 μm film. When observations of visual access were made under normal office lighting (without external windows) then the 6.5 μm film blocked visual access. Finally, the 10 μm film was judged to have almost twice as much scattering power as the 6.5 μm film when both films were viewed side-by-side while facing an external window illuminated by sunlight. The scattering power of the 10 μm film was sufficient to block visual access through an external facing window under normal sunlight conditions, whereas the scattering power of the 6.5 μm film was not. All films demonstrated a stabilized scattering power over time in the OFF state that appeared equally as strong from one minute to one week following turn OFF.

Looking through a film in the OFF state towards a window illuminated by the sun (such as a skylight), or a fluorescent tube, there was some "red-image bleed-though", that is a faint 'red' image of the window or tube could be seen.

One each of the 4.25 μm, 6.5 μm and 10 μm PDCLC films were laminated to 2 mm thick glass panes on both sides using EVA interlayer. There were no perceivable changes in optical characteristics in the films as a consequence of laminating to glass. To judge compatibility with handling, each glass laminate was supported along two ends only and the centre area pressed downward to flex the laminate. Again, there were no perceivable changes in optical characteristics, and the laminates were judged to be compatible with normal handling of switchable window glazing.

Example 2

In example 2 a chiral dopant (ZLI4572) with a high twisting power (about 33.5) is added to nematic liquid crystal MDA-00-3506 (birefringence about 0.25). The resultant helical pitch is similar to example 1 and lies in the range 0.8 to 0.9 micron, and the peak reflection wavelength lies in the range 1.32 to 1.48 micron. A comonomer is also employed—ethyl methacrylate—having a higher reactivity than EHMA. TMPTMA was at 9.17% of the total polymer components by percentage weight.

A 5 g solution containing 7.5 μm spacers was prepared. The weights of the components was as follows:
EHMA=0.828 g
EMA=0.209 g
TMPTMA=0.106 g
BME (@1.125%)=0.013 g
MDA-00-3506=3.718 g
ZLI4572=0.135 g
7.5 μm spacer=0.059 g After a pair of PDCLC films was laminated, they were cured from one side at a UV intensity of 2.8 mW/cm² for 10 minutes. About 75% of droplets have a major axis of between 5 to 7 micron. The same procedure as in example 1 was followed for preparing and assessing the film and glass laminate.

In the ON state the haze performance, both normal and angular viewing, was similar to the 6.5 micron film of example 1 despite the increase in cell gap from 6.5 to 7.5 micron. This is attributed to the increase in a droplet's major axis when compared with example 1. In the OFF state the scattering power was about mid way between the 6.5 micron and 10 micron films of example 1.

The pair of films demonstrated a stabilized scattering power over time in the OFF state that appeared equally as strong from one minute to one week following turn OFF. Again, for the glass laminated film there was no perceivable change in optical characteristics, and the laminate was judged to be compatible with normal handling of switchable window glazing.

Example 3

In example 3 a mix of chiral dopants was used: the resultant helical pitch lies in the range 1.4 to 1.5 micron, and the peak reflection wavelength lies in the range 2.3 to 2.47 micron. TMPTMA was at 7.82% of the total polymer components by percentage weight. IRG651 was used as the photoinitiator.

A 4 g solution containing 14 µm spacers was prepared. The weights of the components was as follows:
EHMA=0.863 g
TMPTMA=0.0752 g
IRG651 (@2.5%)=0.0235 g
MDA-00-3506=2.937 g
ZLI4571 (HTP=−33.5)=0.0361 g
S811 (HTP=−13.8)=0.0674 g
14 µm spacer=0.04 g After a pair of PDCLC films was laminated, they were cured from both sides at a UV intensity of 0.5 mW/cm² for 10 minutes. About 75% of droplets have a major axis of 12 to 14 micron. The same procedure as in example 1 was followed for preparing and assessing the film and glass laminate.

In the ON state the haze performance, both normal and angular viewing, was similar to the 6.5 micron film of example 1; this result is despite the fact that the cell gap is more than doubled. This surprising haze performance in the ON state is attributed to the increase in a droplet's major axis when compared with example 1. The operating voltage was 60V, similar to example 1's films despite example 3 having about twice the cell gap.

In the OFF state the scattering power was significantly stronger than the films of examples 1 and 2. In particular, there was no red-image bleed-through in the OFF state when looking toward a window on a sunny day, or an energized fluorescent tube. The pair of films demonstrated a stabilized scattering power over time in the OFF state that appeared equally as strong from one minute to one week following turn OFF. Again, for the glass laminated film there was no perceivable change in optical characteristics, and the laminate was judged to be compatible with normal handling of switchable window glazing.

The PDCLC devices described herein provide the desired optical states, namely a stabilized, strongly light scattering (or absorbing) OFF state that effectively blocks visual access through a device, and a transparent state that is substantially haze-free and has a wide viewing angle that permits visual access.

A selection method is also provided by the invention, as are precursors of the invention's PDCLC device including monomers, photoinitiators, nematic liquid crystals, and chiral dopants, and associated polymerization conditions for forming a layer of PDCLC material between transparent, conductive substrates.

As a consequence of the disclosures contained herein, many modifications and variations of the present invention will be apparent to those of ordinary skill in the art. It follows that within the scope of the appended claims the present invention can be practiced other than specifically described and shown.

I claim:

1. A polymer-dispersed, cholesteric, liquid crystal system, comprising:
a continuous polymer structure having defined therein a plurality of discrete bodies of liquid crystal material, said bodies of liquid crystal material exhibiting a polydomain state in which the liquid crystal material within each body is arranged in multiple domains, the bodies of liquid crystal having a bulk volume which is free of polymer networks or walls, each domain being defined by a quantity of liquid crystal material whose molecules exhibit a helical structure having a substantially common identifiable alignment in one axis,
wherein the resolved alignments of neighbouring domains diverge substantially from one another and are stable over time,
wherein at an interface between a liquid crystal body and the surrounding polymer structure, where the local surface of said polymer structure at said interface defines a local plane, the molecular structure at said local surface of the polymer structure influences the liquid crystal molecules to take on an alignment which diverges from said local plane of said local polymer surface,
wherein said molecular structure at said polymer surface comprises substituent functional groups extending from the polymer backbone into the liquid crystal material, and
wherein said substituent functional groups cause said mutually divergent alignment within the liquid crystal material.

2. A polymer-dispersed, cholesteric, liquid crystal system as claimed in claim 1, wherein said bodies of liquid crystal material can also be influenced to exhibit a field ON state in which the majority of the liquid crystal molecules within each discrete body of liquid crystal material takes on a substantially common identifiable alignment in one axis.

3. A polymer-dispersed, cholesteric, liquid crystal system as claimed in claim 1, wherein said bodies also exhibit a range of intermediate states between said polydomain and field ON states, resulting in said polymer-dispersed liquid crystal system having optical properties intermediate between those exhibited in the polydomain and field ON states.

4. A polymer-dispersed, cholesteric, liquid crystal system as claimed in claim 1, wherein a majority of said discrete bodies of liquid crystal material have a volume falling within a range bounded by an upper and a lower limit, said lower limit being the minimum volume capable of possessing multiple domains having substantially divergent alignment in the polydomain state, and said upper limit being the maximum volume at which a substantially divergent alignment of domains can still be retained and stabilized within said body in the polydomain state.

5. A polymer-dispersed, cholesteric, liquid crystal system as claimed in claim 1, wherein the majority of said liquid crystal molecules adjacent the polymer surface lie at angles to the local normal to the polymer surface of from 10 to 80 degrees, and more preferably of from 20 to 70 degrees, and most preferably of from 25 to 65 degrees.

6. A polymer-dispersed, cholesteric, liquid crystal system as claimed in claim 5, wherein the majority of neighbouring liquid crystal molecules at the polymer surface do not have substantially the same alignment and wherein they substantially diverge from one another.

7. A polymer-dispersed, cholesteric, liquid crystal system as claimed in claim 5, wherein as a consequence of the alignment of liquid crystal molecules at the polymer surface, the domains that contain liquid crystal molecules that are adjacent the polymer surface have alignments which also diverge from one another, in substantially different directions.

8. A polymer-dispersed, cholesteric, liquid crystal system as claimed in claim 5, wherein the majority of said liquid crystal molecules adjacent the polymer surface lie at angles to the local normal to the polymer surface of from 20 to 70 degrees.

9. A polymer-dispersed, cholesteric, liquid crystal system as claimed in claim 5, wherein the majority of said liquid crystal molecules adjacent the polymer surface lie at angles to the local normal to the polymer surface of from 25 to 65 degrees.

10. A polymer-dispersed, cholesteric, liquid crystal system as claimed in claim 1, wherein said substituent functional groups extending from the polymer backbone into the liquid crystal material are substantially formed from one or more monofunctional monomers, and preferably from 2-ethyl hexyl methacrylate.

11. A polymer-dispersed, cholesteric, liquid crystal system as claimed in claim 1, wherein the total polymer/liquid crystal interface area corresponding to a centimeter square of viewing surface, and expressed in units of centimeters square, where X is a film's cell gap and Y is a film's fraction of liquid crystal by weight, is in the range of 1,714XY to 24,000XY; more preferably in the range of 2,400XY to 20,000XY; and most preferably in the range of 3,429XY to 20,000XY.

12. A polymer-dispersed, cholesteric, liquid crystal system as claimed in claim 1, wherein the pitch of the cholesteric liquid crystal is >0.8 micron, more preferably >0.9 micron, and most preferably >1 micron.

13. A polymer-dispersed, cholesteric, liquid crystal system as claimed in claim 1, wherein at least 75% of the bodies of liquid crystal have a largest dimension in the range of 2.5 to 35 microns.

14. A liquid crystal device comprising a polymer-dispersed liquid crystal structure as claimed in any of claims 1-7, 11, 12 and 13 in the form of a film, a pair of substrates sandwiching said film and bonded to said film, each substrate having a conductive electrode coating on the side facing said polymer-dispersed liquid crystal film to facilitate applying an electric field across said film.

15. A liquid crystal device as claimed in claim 14, provided in a thickness which is operable in a uniform state that is transparent and substantially haze-free to the human eye for a range of viewing angles up to 30 degrees from the normal, and in a polydomain state that blocks visual access through said film.

16. A glazed structure comprising a pair of transparent load-bearing sheets sandwiching a liquid crystal device as claimed in claim 14.

17. A polymer-dispersed, cholesteric, liquid crystal system, comprising:
a continuous polymer structure having defined therein a plurality of discrete bodies of liquid crystal material, said bodies of liquid crystal material exhibiting a polydomain state in which the liquid crystal material within each body is arranged in multiple domains, the bodies of liquid crystal having a bulk volume which is free of polymer networks or walls, each domain being defined by a quantity of liquid crystal material whose molecules exhibit a helical structure having a substantially common identifiable alignment in one axis,
wherein the resolved alignments of neighbouring domains diverge substantially from one another and are stable over time, and wherein at an interface between a liquid crystal body and the surrounding polymer structure, where the local surface of said polymer structure at said interface defines a local plane, the molecular structure at said local surface of the polymer structure influences the liquid crystal molecules to take on an alignment which diverges from said local plane of said local polymer surface,
wherein the total polymer/liquid crystal interface area corresponding to a centimeter square of viewing surface, and expressed in units of centimeters square, where X is a film's cell gap and Y is a film's fraction of liquid crystal by weight, is in the range of 1,714XY to 24,000XY; more preferably in the range of 2,400XY to 20,000XY; and most preferably in the range of 3,429XY to 20,000XY,
wherein said molecular structure at said polymer surface comprises substituent functional groups extending from the polymer backbone into the liquid crystal material, and
wherein said substituent functional groups cause said mutually divergent alignment within the liquid crystal material.

18. A polymer-dispersed, cholesteric, liquid crystal system as claimed in claim 17, wherein a majority of said discrete bodies of liquid crystal material have a volume falling within a range bounded by an upper and a lower limit, said lower limit being the minimum volume capable of possessing multiple domains having substantially divergent alignment in the polydomain state, and said upper limit being the maximum volume at which a substantially divergent alignment of domains can still be retained and stabilized within said body in the polydomain state.

19. A polymer-dispersed, cholesteric, liquid crystal system as claimed in claim 17, wherein at least 75% of the bodies of liquid crystal have a largest dimension in the range of 2.5 to 35 microns.

* * * * *